United States Patent
Rai et al.

(10) Patent No.: US 10,997,063 B1
(45) Date of Patent: *May 4, 2021

(54) SYSTEM TESTING FROM PRODUCTION TRANSACTIONS

(71) Applicant: Wells Fargo Bank, N.A., San Francisco, CA (US)

(72) Inventors: Sunil Rai, Sunnyvale, CA (US); Jonathan Howarth, Berkeley, CA (US); Shashikanth Rao, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,399

(22) Filed: Oct. 31, 2019

Related U.S. Application Data

(63) Continuation of application No. 15/392,884, filed on Dec. 28, 2016, now Pat. No. 10,474,563.

(51) Int. Cl.
 *G06F 11/36* (2006.01)
 *G06F 16/22* (2019.01)
 (Continued)

(52) U.S. Cl.
 CPC ........... *G06F 11/3688* (2013.01); *G06F 8/60* (2013.01); *G06F 11/3672* (2013.01);
 (Continued)

(58) Field of Classification Search
 CPC .... G06F 8/60; G06F 11/3672; G06F 11/3684; G06F 11/3688; G06F 11/3692;
 (Continued)

(56) References Cited

U.S. PATENT DOCUMENTS

| 6,560,564 B2 | 5/2003 | Scarlat et al. |
| 6,587,969 B1 | 7/2003 | Weinberg et al. |

(Continued)

OTHER PUBLICATIONS

Elbaum et al., "Carving and Replaying Differential Unit Test Cases from System Test Cases," in IEEE Transactions on Software Engineering, vol. 35, No. 1, Jan./Feb. 2009, pp. 29-45.

(Continued)

*Primary Examiner* — Andrew M. Lyons
(74) *Attorney, Agent, or Firm* — Shumaker & Sieffert, P.A.

(57) ABSTRACT

Generating, from transactions performed at a production computing system, information that can be used to effectively test new, updated, and/or modified source code to be deployed within the production computing system. In one example, this disclosure describes a method that includes communicating with a production processing system to determine an initial state of the production processing system; capturing information about a plurality of transactions executing across a plurality of application servers included within the production processing system; communicating with a test processing system to deploy source code within the test processing system that is not included in the production processing system; generating a replay test script; and communicating with the test processing system to enable the test processing system to execute the replay test script.

20 Claims, 6 Drawing Sheets

(51) Int. Cl.
*H04L 29/08* (2006.01)
*G06F 8/60* (2018.01)

(52) U.S. Cl.
CPC ...... *G06F 11/3684* (2013.01); *G06F 11/3692* (2013.01); *G06F 16/22* (2019.01); *H04L 67/02* (2013.01)

(58) Field of Classification Search
CPC ............... G06F 17/30312; G06F 16/22; G06F 11/36–3696; H04L 67/02
USPC ................................................. 717/124–135
See application file for complete search history.

(56) References Cited

U.S. PATENT DOCUMENTS

| | | | |
|---|---|---|---|
| 6,993,590 | B1 | 1/2006 | Gauthier et al. |
| 7,043,546 | B2 | 5/2006 | Smith et al. |
| 7,269,633 | B2 | 9/2007 | Allan |
| 7,506,047 | B2 | 3/2009 | Wiles, Jr. |
| 7,523,198 | B2 | 4/2009 | Wu et al. |
| 7,580,822 | B2 | 8/2009 | Nace et al. |
| 7,685,576 | B2 | 3/2010 | Hartmann et al. |
| 7,793,157 | B2 | 9/2010 | Bailey et al. |
| 8,291,068 | B2 | 10/2012 | Kraus et al. |
| 8,352,777 | B2 | 1/2013 | Shilon et al. |
| 8,380,664 | B2 | 2/2013 | Papadomanolakis et al. |
| 8,386,419 | B2 * | 2/2013 | Yalamanchilli ....... G06F 16/283 707/602 |
| 8,402,131 | B2 | 3/2013 | Bansal et al. |
| 8,479,170 | B2 | 7/2013 | Prasad et al. |
| 8,560,502 | B2 | 10/2013 | Vora |
| 8,732,126 | B2 | 5/2014 | Dias et al. |
| 8,751,450 | B1 | 6/2014 | Gaonkar et al. |
| 8,819,213 | B2 | 8/2014 | Frattura et al. |
| 8,874,736 | B2 | 10/2014 | Levi et al. |
| 8,893,089 | B2 | 11/2014 | Rao et al. |
| 8,914,675 | B2 | 12/2014 | Hatano et al. |
| 8,938,532 | B2 | 1/2015 | Terrell et al. |
| 8,990,638 | B1 | 3/2015 | Robichaud |
| 9,176,797 | B1 | 11/2015 | Glenn et al. |
| 9,191,288 | B2 | 11/2015 | Rothstein et al. |
| 9,246,840 | B2 | 1/2016 | Anderson et al. |
| 9,286,180 | B1 | 3/2016 | Musunuri et al. |
| 9,369,366 | B2 | 6/2016 | Richards et al. |
| 9,391,848 | B1 | 7/2016 | Shazly et al. |
| 9,531,736 | B1 | 12/2016 | Torres et al. |
| 9,697,108 | B2 | 7/2017 | Ligman et al. |
| 10,474,563 | B1 | 11/2019 | Rai et al. |
| 2002/0062359 | A1 | 5/2002 | Klopp et al. |
| 2002/0103663 | A1 | 8/2002 | Bankier et al. |
| 2002/0128925 | A1 | 9/2002 | Angeles |
| 2002/0143614 | A1 | 10/2002 | MacLean et al. |
| 2002/0156881 | A1 | 10/2002 | Klopp Lemon et al. |
| 2003/0065986 | A1 | 4/2003 | Fraenkel et al. |
| 2004/0015600 | A1 | 1/2004 | Tiwary et al. |
| 2005/0256665 | A1 * | 11/2005 | Hartmann ............ G06F 11/3684 702/121 |
| 2006/0168467 | A1 | 7/2006 | Couturier et al. |
| 2007/0016831 | A1 | 1/2007 | Gehman et al. |
| 2007/0220347 | A1 * | 9/2007 | Kirtkow .............. G06F 11/3414 714/38.14 |
| 2007/0260641 | A1 | 11/2007 | Bohannon et al. |
| 2007/0266148 | A1 | 11/2007 | Ruiz et al. |
| 2008/0097961 | A1 | 4/2008 | Dias et al. |
| 2009/0037914 | A1 | 2/2009 | Chagoly et al. |
| 2009/0089320 | A1 | 4/2009 | Tendler et al. |
| 2009/0125581 | A1 | 5/2009 | Schneider |
| 2010/0005097 | A1 | 1/2010 | Liang et al. |
| 2010/0076733 | A1 | 3/2010 | Kumar et al. |
| 2010/0095265 | A1 | 4/2010 | Ewing et al. |
| 2010/0257513 | A1 | 10/2010 | Thirumalai et al. |
| 2011/0078666 | A1 | 3/2011 | Altekar |
| 2011/0145795 | A1 | 6/2011 | Khanapurkar et al. |
| 2011/0219359 | A1 | 9/2011 | Gupta |
| 2011/0289488 | A1 | 11/2011 | Ghosh |
| 2012/0084605 | A1 | 4/2012 | Shilon et al. |
| 2012/0192153 | A1 | 7/2012 | Venkatraman et al. |
| 2012/0198476 | A1 | 8/2012 | Markuza et al. |
| 2012/0221519 | A1 | 8/2012 | Papadomanolakis et al. |
| 2013/0166638 | A1 | 6/2013 | Theado et al. |
| 2013/0219220 | A1 * | 8/2013 | Kraus ................. G06F 11/3414 714/32 |
| 2014/0325278 | A1 | 10/2014 | Omar |
| 2015/0046909 | A1 | 2/2015 | Ligman et al. |
| 2015/0180743 | A1 | 6/2015 | Jana et al. |
| 2015/0187177 | A1 | 7/2015 | Warner et al. |
| 2015/0199197 | A1 * | 7/2015 | Maes ................. G06F 11/3672 717/122 |
| 2015/0222503 | A1 | 8/2015 | Bansal et al. |
| 2015/0286470 | A1 | 10/2015 | Dahan |
| 2016/0301732 | A1 * | 10/2016 | Moretto ................. H04L 43/50 |
| 2016/0349928 | A1 | 12/2016 | Li et al. |
| 2017/0048339 | A1 | 2/2017 | Straub |
| 2017/0149810 | A1 | 5/2017 | Keshet et al. |
| 2017/0289008 | A1 * | 10/2017 | Lau ..................... G06F 11/3457 |
| 2017/0300552 | A1 | 10/2017 | Mandadi et al. |
| 2018/0004640 | A1 | 1/2018 | Shavro et al. |
| 2018/0107586 | A1 * | 4/2018 | Vyas ........................ G06F 8/65 |

OTHER PUBLICATIONS

Emek et al., "Scheduling of transactions for system-level test-case generation," Eighth IEEE International High-Level Design Validation and Test Workshop, Nov. 2003, pp. 149-154.

Lin et al., "On-the-Fly Capture and Replay Mechanisms for Multi-Port Network Devices in Operational Networks," in IEEE Transactions on Network and Service Management, vol. 11, No. 2, Jun. 2014, pp. 158-171.

Schultz et al., "An Approach and Mechanism for Auditable and Testable Advanced Transaction Processing Systems," in IEEE Transactions on Software Engineering, vol. SE-13, No. 6, Jun. 1987, pp. 666-676.

Sengupta et al., "Tracking Transaction Footprints for Non-intrusive End-to-End Monitoring," 2008 International Conference on Autonomic Computing, Jun. 2008, pp. 109-118.

Wagner et al., "State propagation-based monitoring of business transactions," 2012 Fifth IEEE International Conference on Service-Oriented Computing and Applications, Dec. 2012, 8 pp.

Xu et al., "Conformance test of distributed transaction service," Proceedings of the 12th Asian Test Symposium, IEEE, Nov. 2003, pp. 216-219.

Xu et al., "Resource State Monitoring of Service Transactions in Cloud Systems," 2014 IEEE International Conference on Services Computing, Jun./Jul. 2014, pp. 512-519.

Huang et al., "Stateful Traffic Replay for Web Application Proxies," Security and Communication Networks, vol. 8, Issue 6, John Wiley & Sons, Ltd., Apr. 1, 2015, 12 pp.

Prosecution History from U.S. Appl. No. 15/392,884, dated Jan. 11, 2018 through Jul. 3, 2019, 112 pp.

* cited by examiner

```
URL=/SIMSAPP/AUTHENTICATION/AUTHLOGIN
HTTP_SOAPACTION="HTTP://SERVICE.WELLSFARGO.COM/PROVIDER/SIMS/FFIEC/AUTH/2012/"
HTTP_WFSOAPACTION=
HTTP_COOKIE=
REQUESTTIMEEX=1451606633.523075
XML1=<REQUEST>
<S:ENVELOPE XMLNS:S="HTTP://SCHEMAS.XMLSOAP.ORG/SOAP/ENVELOPE/">...
   ...</S:BODY></S:ENVELOPE></REQUEST>
```

SYSTEM TESTING FROM PRODUCTION TRANSACTIONS

CROSS REFERENCE

This application is a continuation application of and claims priority to U.S. patent application Ser. No. 15/392,884 filed on Dec. 28, 2016, which is hereby incorporated by reference herein in its entirety.

TECHNICAL FIELD

The disclosure relates to testing of computing systems, and more specifically, techniques for performance, regression, and/or security testing of computing systems.

BACKGROUND

Testing computing systems can be a complicated process that is difficult to perform effectively. Some aspects of performance testing, regression testing, and security testing may involve development and maintenance of test scripts. Developing test scripts that provide adequate coverage of the code under test is a labor-intensive and time-consuming task, as is maintaining the test scripts throughout their life cycle.

SUMMARY

Aspects of this disclosure relate to techniques for generating, from transactions performed at a production computing system, information that can be used to effectively test new, updated, or modified source code to be deployed within the production computing system. In some examples, a transaction capture system captures transactions processed by the production computing system, and generates, based on the captured transactions, a set of transactions for use in testing the new, updated, or modified source code within a testing environment. In some examples, the transaction capture system may also capture the state of the production system at multiple points in time. Such state information may represent the state of the production system before and after the captured transactions are processed within the production computing system.

In accordance with one or more aspects of the present disclosure, a test environment is configured that mirrors, matches, or otherwise or corresponds to the production computing system in one or more ways. Source code under test may be deployed within the test environment in a way that corresponds to the manner in which the source code is expected to be deployed within the production environment. The test environment may generate a test script from the set of transactions captured by the transaction capture system. Accordingly, the test script may simulate or replay actual transactions performed by the production computing system. The test environment may execute the test script within the test environment, thereby simulating actual user behavior and code coverage under load, and thereby effectively testing the source code under test. The behavior and performance of the test environment may be observed and evaluated. In some examples, the performance of the test environment may be compared to the performance of the production computing system. Additionally, or alternatively, the state of the test environment, after the captured transactions are processed, may be compared to the state of the production computing system after the production computing system processed the corresponding transactions.

In some examples, a test script derived from actual transactions processed in production may simplify and streamline testing, since the process may be automated to an extent that little or no labor may be required to generate the test script. Further, such a test script may more accurately provide production-level code coverage for performance and regression testing, because the test script is generated based on transactions observed in production. In some examples, it may be possible to effectively test a computing system using only a single periodically-updated test script that is derived from transactions captured in production, where that single test script may be executed in response to a single input from a user, in accordance with one or more aspects of the present disclosure.

In one example, a method comprises: communicating with a production processing system, by a computing system and over a network, to determine an initial state of the production processing system; capturing, by the computing system and based on network traffic observed within the production processing system, information about a plurality of transactions executing across a plurality of application servers included within the production processing system, wherein the information about the plurality of transactions includes information identifying hypertext transfer protocol requests and responses involving one or more of the plurality of application servers; communicating with a test processing system, by the computing system and over the network, to deploy source code within the test processing system that is not included in the production processing system, wherein the test processing system includes a plurality of test application servers; generating, by the computing system and based on the information about the plurality of transactions executing across the plurality of application servers within the production processing system, a replay test script, wherein the replay test script comprises a replay of the plurality of transactions; and communicating with the test processing system, by the computing system and over the network, to enable the test processing system to execute the replay test script.

In another example, a system comprises: a production processing system; a test processing system; and a computing system having access to the production processing system and the test processing system over a network. The computing system comprises processing circuitry configured to: communicate with a production processing system, over a network, to determine an initial state of the production processing system, capture, based on network traffic observed within the production processing system, information about a plurality of transactions executing across a plurality of application servers included within the production processing system, wherein the information about the plurality of transactions includes information identifying hypertext transfer protocol requests and responses involving one or more of the plurality of application servers, communicate with a test processing system, over the network, to deploy source code within the test processing system that is not included in the production processing system, wherein the test processing system includes a plurality of test application servers, generate, based on the information about the plurality of transactions executing across the plurality of application servers within the production processing system, a replay test script, wherein the replay test script comprises a replay of the plurality of transactions, and communicate with the test processing system, over the network, to enable the test processing system to execute the replay test script.

In another example, a computer-readable storage medium comprises instructions that, when executed, configure processing circuitry of a computing system to: communicate with a production processing system, over a network, to determine an initial state of the production processing system; capture, based on network traffic observed within the production processing system, information about a plurality of transactions executing across a plurality of application servers included within the production processing system, wherein the information about the plurality of transactions includes information identifying hypertext transfer protocol requests and responses involving one or more of the plurality of application servers; communicate with a test processing system, over the network, to deploy source code within the test processing system that is not included in the production processing system, wherein the test processing system includes a plurality of test application servers; generate, based on the information about the plurality of transactions executing across the plurality of application servers within the production processing system, a replay test script, wherein the replay test script comprises a replay of the plurality of transactions; and communicate with the test processing system, over the network, to enable the test processing system to execute the replay test script.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 5 illustrates example extract data generated by an example transaction capture system as a result of processing transaction data captured within an example production environment, in accordance with one or more aspects of the present disclosure.

DETAILED DESCRIPTION

Figure 1:
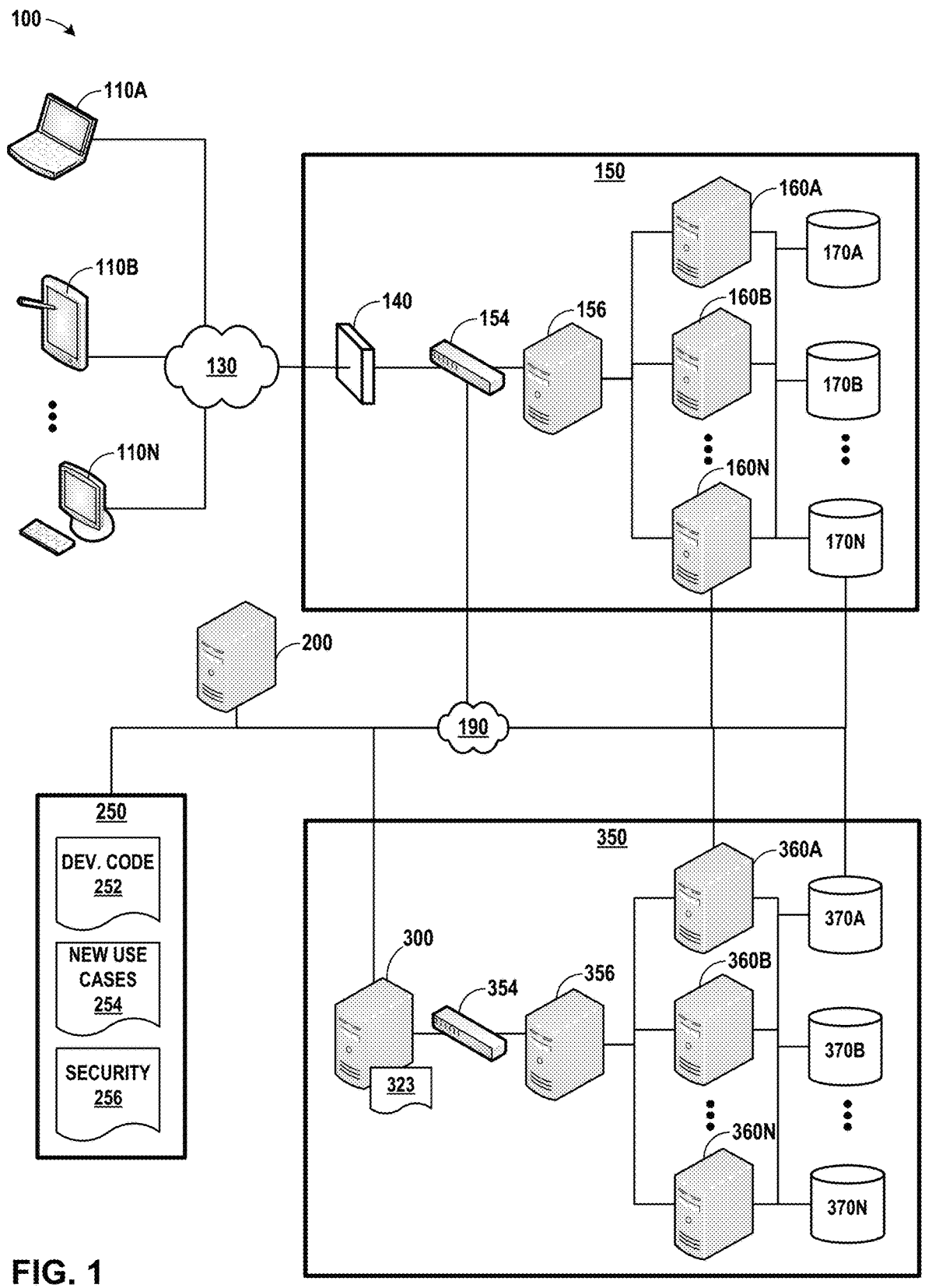
FIG. 1 is a conceptual diagram illustrating an example production environment and an example test environment that may be used for testing source code to be deployed within the production environment, in accordance with one or more aspects of the present disclosure.

FIG. 1 is a conceptual diagram illustrating an example production environment and an example test environment that may be used for testing source code to be deployed within the production environment, in accordance with one or more aspects of the present disclosure. FIG. 1 illustrates one example implementation of system 100. Other implementations of system 100 may be appropriate in other instances. Such implementations may include a subset of the components included in the example of FIG. 1 and/or may include additional components not shown in FIG. 1.

In the example of FIG. 1, system 100 includes one or more computing devices 110 in communication, via network 130, with production environment 150. Computing devices 110 may include computing device 110A through computing device 110N (collectively referred to as "computing devices 110"). As used in FIG. 1, "N" represents any number, so that "computing device 110A through computing device 110N" represents any number of computing devices 110. FIG. 1 further includes transaction capture system 200, private network 190, development environment 250, and test environment 350.

In the example of FIG. 1, production environment 150 includes firewall 140, network monitor 154, load balancer 156, one or more production application servers 160, and one or more production data stores 170. Production application servers 160 may include production application server 160A through production application server 160N (collectively referred to as "production application servers 160" and representing any number of production application servers 160). Similarly, production data stores 170 may include production data store 170A through production data store 170N (collectively referred to as "production data stores 170" and representing any number of production data stores 170). Test environment 350 includes test system 300, network monitor 354, load balancer 356, application server 360A through application server 360N, and data store 370A through data store 370N. Again, "application servers 360" and "test environment data stores 370" represent any number of application servers 360 and test environment data stores 370, respectively.

Although functions and operations described in connection with system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner. For example, functionality provided by transaction capture system 200 and test system 300 may, in some examples, be provided by a single system.

Each of computing devices 110 may be implemented as any suitable computing system, such as a mobile, non-mobile, wearable, and/or non-wearable computing device. Each of computing devices 110 may represent a device that performs operations described herein as the result of instructions, stored on a computer-readable storage medium, executing on one or more processors. The instructions may be in the form of software stored on one or more local or remote computer readable storage devices. In other examples, one or more of computing devices 110 may perform operations using hardware, firmware, or a mixture of hardware, software, and firmware residing in and/or executing at each of computing devices 110.

One or more of computing devices 110 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure. Further, although computing devices 110 may each be a stand-alone device, computing devices 110 may, generally, take any of a number of different forms. For example, one or more of computing devices 110 may be implemented through multiple devices and/or systems. In another example, one or more computing devices 110 may be, or may be part of, any component, device, or system that includes a processor or other suitable computing environment for processing information or executing software instructions. Also, although one or more of computing devices 110 may be illustrated in FIG. 1 as similar devices, one or more of computing devices 110 may be different from others, and may be implemented using widely diverse hardware, software, and other components.

Each of computing devices 110 may serve as a device that enables a user to interact with, browse, and/or use information or resources available over a network (e.g., network 130). For instance, one or more of computing devices 110 may, at the direction of a user, access information within production environment 150 over network 130, which may include services provided by, for example, a bank or other organization. In some examples, a user of one or more computing devices 110 may be a bank customer. One or more computing devices 110 may access services provided by production application servers 160 within production environment 150, and communicate with production application servers 160 over network 130. One or more computing devices 110 may browse for information otherwise available through network 130, communicate with others, perform calculations, analyze data, monitor or check or process a user's personal communications, control other devices, perform a physical task or cause one to be performed, or access other information or resources.

Network 130 may be the internet, or may represent any public or private communications network or other network. For instance, network 130 may be a cellular, Wi-Fi®, ZigBee, Bluetooth, NFC, satellite, and/or other type of network enabling transfer of transmitting data between computing systems, servers, and computing devices. One or more of client devices, server devices, or other devices may transmit and receive data, commands, control signals, and/or other information across network 130 using any suitable communication techniques. Network 130 may include one or more network hubs, network switches, network routers, satellite dishes, or any other network equipment. Such devices or components may be are operatively intercoupled, thereby providing for the exchange of information between computers, devices, or other components (e.g., between one or more client devices or systems and one or more server devices or systems). Each of the devices or systems illustrated in FIG. 1 may be operatively coupled to network 130 using one or more network links. The links coupling such devices or systems to network 130 may be Ethernet, Asynchronous Transfer mode (ATM) or other types of network connections, and such connections may be wireless and/or wired connections. One or more of the devices or systems illustrated as being on network 130 (in FIG. 1 or otherwise) may be in a remote location relative to one or more other illustrated devices or systems. For example, one or more of the devices, systems, and/or environments (e.g., production environment 150, development environment 250, and/or test environment 350) illustrated in FIG. 1 may be colocated and/or physically near each other. In other examples one of more of the devices, systems, and/or environments illustrated in FIG. 1 may be physically separated and/or distributed across network 130 or otherwise.

One or more firewalls 140 may represent devices that perform functions relating to the monitor, control, filter, and/or rejection of certain data, packets, or other information received over network 130 that does not satisfy security or other criteria applied by firewall 140. In some examples, one or more firewalls 140 may be a hardware device. In other examples, one or more firewalls 140 may represent a computing device that performs operations described herein as the result of instructions, stored on a computer-readable storage medium, executing on one or more processors. The instructions may be in the form of software stored on one or more local or remote computer readable storage devices. In these and other examples, firewall 140 may perform operations using hardware, firmware, or a mixture of hardware, software, and firmware residing in and/or executing at firewall 140.

One or more network monitors 154 may represent a device that performs functions relating to monitoring network traffic or network transactions within production environment 150. Network monitor 154 may receive a network request over network 130 from firewall 140, and may store information relating to the network request. Network monitor 154 may output to load balancer 156 the network request. In some examples, network monitor 154 may pass information from firewall 140 to load balancer 156 without modification. Network monitor 154 may receive a network response within production environment 150 from load balancer 156, and may store information relating to the network response. In some examples, network monitor 154 may pass information from load balancer 156 to firewall 140 without modification. Network monitor 154 may send, to transaction capture system 200, information about the network traffic passing through network monitor 154. In some examples, network monitor 154 may be a hardware device. In other examples, network monitor 154 may represent a computing device that performs operations described herein as the result of instructions, stored on a computer-readable storage medium, executing on one or more processors. The instructions may be in the form of software stored on one or more local or remote computer readable storage devices. In these and other examples, network monitor 154 may perform operations using hardware, firmware, or a mixture of hardware, software, and firmware residing in and/or executing at network monitor 154. In some examples, aspects of network monitor 154 may be implemented in part through a network monitoring device made available by APCON, Inc. of Wilsonville, Oreg.

One or more load balancers 156 may represent a device that performs functions relating to allocating or distributing transaction requests from network monitor 354 across production application servers 160 in a manner that may enhance the speed, efficiency, and/or capacity utilization of one or more production application servers 160. Load balancer 156 may route client transaction requests across servers capable of fulfilling those requests. For instance, load balancer 156 may seek to balance the request and other network traffic from network monitor 154 to maintain an appropriate level of performance for each of production application servers 160 pursuant to a load balancing algorithm. Load balancer 156 may receive transaction responses from one or more production application servers 160 and output information about the transaction response to network monitor 354. In some examples, load balancer 156 may be a hardware device. In other examples, load balancer 156 may represent a computing device that performs operations described herein as the result of instructions, stored on a computer-readable storage medium, executing on one or more processors. The instructions may be in the form of software stored on one or more local or remote computer readable storage devices. In these and other examples, load balancer 156 may perform operations using hardware, firmware, or a mixture of hardware, software, and firmware residing in and/or executing at load balancer 156.

Production application servers 160 may represent a server farm, server cluster, or server pool comprising a group of backend servers. In other examples, one or more of production application servers 160 may represent systems or groups of systems devoted to a particular application or task. Production application servers 160 may each be implemented as any suitable computing system, such as one or more server computers, mainframes, appliances, cloud computing systems, and/or other computing systems capable of sending and receiving information both to and from a network (e.g., network 130) from within production environment 150. For example, production application servers 160 may host or provide access to services provided by one or more modules of production application servers 160. Client devices (e.g., one or more computing devices 110) may communicate with production application servers 160 over network 130 to access services provided by one or more modules of production application servers 160. Production application servers 160 may provide, for instance, banking services in response to authentication credentials and requests received from one or more client devices. In some examples, production application servers 160 may collectively or individually represent a cloud computing system that provides services to client devices and other devices or systems. Although one or more of production application servers 160 may be similar devices, one or more of production application servers 160 may be different from others, and may be implemented using widely diverse hardware, software, and other components.

Production data stores 170 may represent any suitable storage medium or computing device comprising a storage medium for storing information related to functions performed by production application servers 160. Production data stores 170 may be implemented as part of a server farm or server pool (e.g., a server farm comprising production application servers 160 and production data stores 170). The information stored in production data stores 170 may be searchable and/or categorized such that production application servers 160 or one or more modules of production application servers 160 may provide an input requesting information from production data stores 170, and in response to the input, receive responsive information stored within production data stores 170. Production data stores 170 may each be primarily maintained by one or more of production application servers 160. Production data stores 170 may provide production application servers 160 with access to the data stored within production data stores 170, and/or may analyze the data stored within production data stores 170 and output such information on behalf of production application servers 160 or other devices.

Private network 190 may be a network enabling one or more of network monitor 154, transaction capture system 200, development environment 250, test system 300, production application servers 160, production data stores 170, application servers 360, test environment data stores 370, and/or other devices to communicate. Private network 190 may represent a secure communications network not generally available to the public, and which may include any type of network enabling transfer of transmitting data between computing systems, servers, and computing devices. Although illustrated as a network, private network 190 may be, or may include, direct connections between one or more devices illustrated in FIG. 1. One or more of such devices may transmit and receive data, commands, control signals, and/or other information across private network 190 using any suitable communication techniques. Private network 190 may be implemented as one or more hardware devices, or private network 190 may be implemented through a combination of hardware, software, and/or firmware.

Transaction capture system 200 may include one or more computing devices that operate to capture and store information about transactions performed within production environment 150. In some examples, transaction capture system 200 may capture server side requests and responses, and transaction capture system 200 may also capture client side requests, so that website interactions or functions from a client's perspective, such as interactions with a user interface element within a web page (e.g., clicking a checkbox) are recorded. Transaction capture system 200 may receive information about transactions monitored by network monitor 154, and may process the information about the transactions to generate extract files associated with the transactions. Transaction capture system 200 may also collect state information from within production environment 150 (e.g., from production data stores 170). Transaction capture system 200 may send, to test system 300 and/or other systems, information about transactions processed by production environment 150 and/or state information associated with production environment 150. In some examples, transaction capture system 200 may communicate with network monitor 154, and cause network monitor 154 to start, stop, and/or pause the flow of transactions to transaction capture system 200.

Transaction capture system 200 may represent a computing system that performs operations described herein as the result of instructions, stored on a computer-readable storage medium, executing on one or more processors. The instructions may be in the form of software stored on one or more local or remote computer readable storage devices. In such examples, transaction capture system 200 may be implemented as any suitable computing system, such as one or more server computers, cloud computing systems, server appliances, mainframes, and/or other computing systems capable performing operations in accordance with one or more aspects of the present disclosure. In some examples, transaction capture system 200 may perform operations using hardware, firmware, or a mixture of hardware, software, and firmware residing in and/or executing at transaction capture system 200. Although transaction capture system 200 of FIG. 1 may be a stand-alone device, one or more transaction capture systems 200 may, generally, take many forms, and may be implemented using multiple devices and/or systems. In other examples, one or more transaction capture systems 200 may be, or may be part of, any component, device, or system that includes a processor or other suitable computing environment for processing information or executing software instructions and that operates in accordance with one or more aspects of the present disclosure. For example, functionality provided transaction capture system 200 may be integrated into or included within test system 300. In some examples, aspects of transaction capture system 200 may be implemented in part by one or more customer experience management products, such as Tealeaf from IBM.

Development environment 250 may be, or may include, a system of computing devices used to develop software, test scripts, and other code, data, or information for use on one or more production application servers 160 and/or one or more application servers 360. Development environment 250 may include one or more workstations, laptops, desktops, or server computers that may be used in developing source code and/or software. One or more of such devices may perform operations relating to creation, modification, compilation, debugging, unit testing, and/or maintenance of source code. For instance, development environment 250 may, at the direction of one or more developers or users, generate source code for eventual deployment at production application servers 160 and/or application servers 360. Such source code may include new code to address bugs, inefficiencies, security vulnerabilities, and/or logical errors in a prior version of the source code. Development environment 250 may also, at the direction of one or more developers or user, develop one or more test scripts for use within test environment 350. Development environment 250 may communicate information, source code, test scripts, and other information to one or more other devices and systems of system 100 over private network 190.

Test system 300 may be, or may include, a system of computing devices that operate to cause test environment 350 to process transactions, which may include transactions derived from transactions performed within production environment 150. Test system 300 may process information collected by transaction capture system 200 to generate one or more test scripts corresponding to transactions performed within production environment 150. Test system 300 may execute the test script, which may replay, within test environment 350, the transactions captured within production environment 150. In this way, test system 300 may test one or more modules executing at application servers 360 or elsewhere within test environment 350. Transaction capture system 200 may initialize the state of test environment 350, generate transactions to be processed by test environment 350. Test system 300 may evaluate the performance and behavior of test environment 350 while transactions are being processed by test environment 350, and may evaluate the performance and state of test environment 350 after the transactions are processed. Test system 300 may be, or may include, a load generator that is used to simulate a data feed or a transaction feed derived from transactions captured within production environment 150.

Test system 300 may represent a computing device that performs operations described herein as the result of instructions, stored on a computer-readable storage medium, executing on one or more processors. The instructions may be in the form of software stored on one or more local or remote computer readable storage devices. In such examples, test system 300 may be implemented as any suitable computing system, such as one or more server computers, cloud computing systems, server appliances, mainframes, and/or other computing systems capable performing operations in accordance with one or more aspects of the present disclosure. In some examples, test system 300 may perform operations using hardware, firmware, or a mixture of hardware, software, and firmware residing in and/or executing at test system 300. Although test system 300 of FIG. 1 may be a stand-alone device, one or more transaction replay systems 300 may, generally, take many forms, and may be implemented using multiple devices and/or systems. In other examples, one or more transaction replay systems 300 may be, or may be part of, any component, device, or system that includes a processor or other suitable computing environment for processing information or executing software instructions and that operates in accordance with one or more aspects of the present disclosure. For example, functionality provided by test system 300 may be integrated into or included within transaction capture system 200. In some examples, aspects of test system 300 may be implemented in part through a Netstorm load generator, available from Cavisson Systems Inc., of Santa Clara, Calif.

Network monitor 354, load balancer 356, application servers 360, and test environment data stores 370 within test environment 350 may be implemented in the same way and/or may otherwise correspond to network monitor 154, load balancer 156, production application servers 160, and production data stores 170, respectively, within production environment 150. For instance, network monitor 354 may correspond to network monitor 154, and load balancer 356 may correspond to load balancer 156. In other examples, network monitor 354 may be implemented differently than network monitor 154, and load balancer 356 may be implemented differently than load balancer 156. Application servers 360 may correspond to production application servers 160, although one or more modules under test may be implemented in a manner that is different than production application servers 160. Test environment data stores 370 may correspond to production data stores 170, and may be configured to match the state of production data stores 170. One or more of application servers 360 and/or test environment data stores 370 may be implemented through a service virtualization server, device, or module that simulates the behavior, data, and performance characteristics of one or more of production application servers 160 and/or production data stores 170. In some examples, it may be difficult or costly to reproduce one or more of production application servers 160 and production data stores 170 within test environment 350, so the services provided by such a device may be simulated or virtualized by a virtualization service. Further, in some examples, one or more of network monitors 354, load balancer 356, application servers 360, and/or test environment data stores 370 may be optional. For instance, network monitor firewall 140 and network monitor 154 might not be implemented in test environment 350.

In FIG. 1, and in accordance with one or more aspects of the present disclosure, one or more of computing devices 110 may interact with one or more of production application servers 160 within production environment 150. For example, computing device 110A may detect input that it determines corresponds to a request to access a service provided by one or more of production application servers 160. Computing device 110A may output signals over network 130 in the form of a network request that network 130 routes to firewall 140. Firewall 140 may detect the network request and pass the request through to network monitor 154. In some instances, firewall 140 may monitor, control, filter, and/or reject certain data, packets, or other information received over network 130 that does not satisfy security or other criteria applied by firewall 140. Network monitor 154 may monitor the network request received from firewall 140 and output the request to load balancer 156. Network monitor 154 may also communicate, to transaction capture system 200, information about the network traffic passing through network monitor 154, as further described below. Load balancer 156 may receive the request from network monitor 154 and may allocate or distribute the request across production application servers 160 in a manner that enhances speed, efficiency, and/or capacity utilization of one or more production application servers 160. For instance, load balancer 156 may seek to balance the request and other network traffic from network monitor 154 to maintain an appropriate level of performance for each of production application servers 160.

One or more of production application servers 160 may perform an operation in response to the request received from computing device 110A. For example, load balancer 156 may route a request originating from computing device 110A to production application server 160A. Production application server 160A may receive the request (or a portion of the request) from load balancer 156 and determine that it corresponds to a request to perform an operation involving one or more of production data stores 170. Production application server 160A may perform the operation by accessing or modifying data within one or more production data stores 170. Alternatively, or additionally, production application server 160A may add data included in the request to one or more of production data stores 170. Production application server 160A may output a response that is communicated through load balancer 156 and network monitor 154 to firewall 140. Firewall 140 may monitor, control, filter, and/or reject certain data, packets, or other information included in the response before outputting the response to network 130. Network 130 may the response from firewall 140 and route the response to computing device 110A. Computing device 110A may receive the response and output information to a user of computing device 110A based on the response received. For example, computing device 110A may present an updated user interface at a display associated with computing device 110A.

Other computing devices 110 may interact with one or more of production application servers 160. For example, computing device 110B may detect input that it determines corresponds to a request to access a service of production environment 150. Computing device 110B may output signals over network 130 that are passed through firewall 140 and network monitor 154 to load balancer 156. Load balancer 156 may allocate the request to, for example, production application server 160B and/or production application server 160N. Production application server 160B may perform an operation that it determines is identified or specified in the request from computing device 110B. Production application server 160B may respond to computing device 110B by outputting information that is communicated through production environment 150, reaches firewall 140, and is routed over network 130. Computing device 110B may receive information over network 130 that it determines corresponds to a response to its request to access a service of production environment 150.

In general, computing devices 110 may interact with one or more of services provided by production environment 150 by sending a request over network 130 that reaches one or more production application servers 160, and receiving, over network 130, a response originating from one or more production application servers 160. Such requests and responses may be considered transactions executed, performed, or processed by production environment 150. Such transactions may involve hypertext transfer protocol (HTTP) requests initiated by one or more of computing devices 110 and http responses from one or more of production application servers 160.

Network monitor 154 may be configured to send, to transaction capture system 200, information about transactions processed by production environment 150. For example, network monitor 154 may detect input that it determines corresponds to a request to send, to transaction capture system 200, some or all of the network packets or other data that passes through network monitor 154 when transactions are processed by production environment 150. In some examples, the input detected by network monitor 154 may be in the form of one or more signals received by network monitor 154 from transaction capture system 200 over private network 190. In other examples, the input detected by network monitor 154 may be in the form of one or more signals received by network monitor 154 from one or more other devices. In other examples, the input detected by network monitor 154 may be input that network monitor 154 determines corresponds to user input.

While transactions are being processed by production environment 150, transaction capture system 200 may capture and store data associated with transactions performed by production environment 150. For example, network monitor 154 may receive transaction data from firewall 140 (e.g., transaction requests from one or more of computing devices 110) and pass the transaction data to load balancer 156. Network monitor 154 may also send, over private network 190, to transaction capture system 200, information about the transaction data that network monitor 154 passes from firewall 140 to load balancer 156. Similarly, network monitor 154 may receive transaction data from load balancer 156 (e.g., transaction responses from one or more of production application servers 160) and pass the transaction data to firewall 140. Load balancer 156 may also send, over private network 190, to transaction capture system 200, information about the transaction data that network monitor 154 passes from load balancer 156 to firewall 140.

Transaction capture system 200 may process the data it receives from network monitor 154. For example, transaction capture system 200 may receive transaction data from network monitor 154 in the form of packets, data streams, or other forms. Transaction capture system 200 may organize the transaction data received from network monitor 154 into requests and responses, and/or filter out unwanted and/or unnecessary transactions. Transaction capture system 200 may apply corrections and adjustments to the transaction data. In some examples, transaction capture system 200 may apply such corrections to the transaction data in near or seemingly near real-time, while receiving transaction data from network monitor 154, and while the transactions are being processed within production environment 150. In other examples, transaction capture system 200 may apply such corrections to the transaction data after receiving the transaction data from network monitor 154. Transaction capture system 200 may store the processed transaction data within one or more storage units associated with transaction capture system 200.

Transaction capture system 200 may collect information about the state of production environment 150. For example, transaction capture system 200 may output a signal over private network 190. One or more of production data stores 170 may detect a signal from private network 190 and determine that the signal corresponds to a request for state information relating to production data stores 170. One or more production data stores 170 may send information over private network 190 destined for transaction capture system 200. Transaction capture system 200 may detect input and determine that the input corresponds to information representing the state of production data stores 170 for a particular point in time (e.g., time "t1"). Transaction capture system 200 may store the information about the state, at t1, of production data stores 170.

Transaction capture system 200 may capture information about the state of production environment 150 at a later point in time. For example, at some point after t1, which may be minutes, hours, or days after t1, transaction capture system 200 may output one or more signals over private network 190. One or more production data stores 170 may detect input over private network 190 and determine that the input corresponds to a request for information about the current state of production data stores 170. One or more production data stores 170 may output, over private network 190, information about the state of private networks 190 at this later time. Transaction capture system 200 may receive information over private network 190 that it determines corresponds to information about the state of production data stores 170 for the later time (e.g., time "t2"). Transaction capture system 200 may store the state information about the state, at t2, of production data stores 170.

Accordingly, information collected by transaction capture system 200 may include both state information and transaction information. Transaction capture system 200 may capture the state of production environment 150 at times t1 and t2, along with information about the transactions performed by production environment 150 between times t1 and t2.

Development environment 250 may create, modify, update, and/or otherwise generate development code 252 for eventual execution on one or more production application servers 160. Development code 252 may include new code relating to new features to be implemented within production environment 150 and/or by production application servers 160. Development code 252 may include new code to implement new features, or development code 252 may include code to address bugs, inefficiencies, security vulnerabilities, and/or logical errors in a prior version of development code 252. To create development code 252, development environment 250 may detect input from one or more users that development environment 250 determines corresponds to software development activity. For example, development environment 250 may detect input that corresponds to creation, modification, compilation, debugging, unit testing, maintenance, and/or other activities relating to source code designed for one or more production application servers 160 or other computing devices or aspects of production environment 150. Development environment 250 may translate such activity into development code 252, which may be designed for execution on one or more production application servers 160. Development environment 250 may store development code 252 resulting from such modifications on one or more storage devices associated with development environment 250.

Development environment 250 may also, as directed by one or more developers, test engineers, or users, create new use case scripts 254 for testing new portions of development code 252 within test environment 350. For example, development environment 250 may detect input from one or more users of development environment 250 that development environment 250 determines corresponds to creation of test scripts for new use cases relating to development code 252. Development environment 250 may store such new use case test scripts as new use case scripts 254.

In some examples, a use case is a particular use of the system by a user (e.g., a user of one or more of computing devices 110) that describes interactions, on a transaction by transaction basis, between the user and production environment 150 to enable the user to achieve a specific task (e.g., logging into a web site, performing a banking transaction). In some examples, a use case is a sequence of steps that describes the interactions between the user and production environment 150 primarily in terms of the user, rather than from the perspective of production environment 150. In such an example, a use case may describe what the user does and what the user sees, rather than in terms of the inputs expected and the outputs generated by production environment 150.

A new use case is a use case relating to functionality introduced by development code 252, or prior features of production environment 150 that have been modified by development code 252. New use case scripts 254 may therefore exercise and/or test functionality introduced by development code 252 or prior features of production environment 150 modified by development code 252. In some examples, new use case scripts 254 may be designed, at least in part, to uncover integration defects (i.e., defects caused by the incorrect interaction between development code 252 and existing software components).

Development environment 250 may also detect input from one or more users of development environment 250 that development environment 250 determines corresponds to creation of test scripts relating to security functions implicated by development code 252. Development environment 250 may store such test scripts as security testing scripts 256. Security testing scripts 256 may be similar to new use case scripts 254, but may be primarily directed to exercising and/or testing functionality relating to security aspects of production environment 150.

If development code 252 were to be deployed across production environment 150 on one or more production application servers 160 before being properly tested and/or verified, development code 252 may cause production environment 150 to operate improperly, perform less efficiently, and/or be exposed to one or more security vulnerabilities. Accordingly, before being deployed within production environment 150 on one or more production application servers 160, development environment 250 may deploy development code 252 within test environment 350 for testing purposes. For example, development environment 250 may output a signal over private network 190. One or more application servers 360 may receive a signal over private network 190. One or more application servers 360 may determine that the signal corresponds to a request to deploy or install development code 252 for execution on one or more application servers 360. One or more application servers 360 may install development code 252 and/or store development code 252 in storage devices associated with application servers 360 as one or more modules for execution by processors of application servers 360.

Test system 300 may create a replay test script comprising replay transactions 323 based on transactions captured by transaction capture system 200 between times t1 and t2. For example, transaction capture system 200 may output over private network 190 information about the transactions captured and stored by transaction capture system 200 between time t1 and t2. Test system 300 may detect input from private network 190 and determine that the input corresponds to or includes transaction information relating to transactions performed by production environment 150 between time t1 and t2. Test system 300 may generate an initial version of replay transactions 323 by processing the transaction information received from transaction capture system 200 to create a test script that includes transactions that correspond to those collected by transaction capture system 200 between times t1 and t2.

Development environment 250 may output over private network 190 information about new use case scripts 254 and security testing scripts 256. Test system 300 may detect input over private network 190 and determine that the input corresponds to information about new use case scripts 254 and security testing scripts 256. Test system 300 may merge transactions derived from the information about new use case scripts 254 and security testing scripts 256 with the initial version of replay transactions 323 generated by test system 300. Test system 300 may store the merged transactions as replay transactions 323. Replay transactions 323 may serve as a replay test script.

Test system 300 may configure the state of test environment 350 to correspond to the state of production environment 150 at time t1. For example, transaction capture system 200 may output state information over private network 190. Test system 300 may receive a signal from private network 190 and determine that the signal corresponds to state information, at time t1, for production data stores 170. Test system 300 may output over private network 190 information about the state of production data stores 170 at time t1. One or more test environment data stores 370 may detect input from private network 190 and determine that the input represents state information and instructions to initialize the state of test environment data stores 370 to correspond to the state of production data stores 170 at time t1. One or more test environment data stores 370 may update their state to correspond to the state of production data stores 170 at time t1.

Test system 300 may test the function, operation, performance, and/or other characteristics of development code 252 by replaying, within test environment 350, replay transactions 323 as a replay test script. For example, test system 300 may, based on replay transactions 323, output a signal within test environment 350. Network monitor 354 and/or load balancer 356 may detect the signal and determine that the signal corresponds to a request to access a service of one or more of application servers 360. Load balancer 356 may allocate the request to one or more of application servers 360. For instance, load balancer 356 may allocate the request to application server 360B. Application server 360B may receive the request and determine that the request corresponds to a request to perform one or more operations. Application server 360B may perform an operation, which may involve modification of one or more test environment data stores 370. Application server 360B may respond to the request by sending a response to test system 300 through load balancer 356 and network monitor 354. Test system 300 may receive the response. Test system 300 may continue to replay, within test environment 350, replay transactions 323. For each transaction within replay transactions 323, test system 300 may output one or more corresponding signals that may cause application servers 360 to perform operations. In this way, test system 300 may simulate, within test environment 350, operations performed by production environment 150. Test system 300 may eventually cause test environment 350 to process all transactions within replay transactions 323, so that test environment 350 has processed the transactions corresponding to those processed by production environment 150 between time t1 and t2.

By replaying replay transactions 323 within test environment 350, test system 300 may test the performance and operation of development code 252 by observing the performance and behavior of test environment 350. For example, after test system 300 finishes replaying replay transactions 323, the state of test environment data stores 370 may correspond to the state of production data stores 170 at time t2, since the transactions within replay transactions 323 may correspond to those processed within production environment 150 between times t1 and t2. Accordingly, after processing the transactions within replay transactions 323, at least some aspects of test environment 350 should in some cases, if development code 252 operated properly, be a mirror image or corresponding image of production environment 150 at time t2. In other words, if the state of test environment data stores 370 after replaying replay transactions 323 corresponds to the state of production data stores 170 at time t2, then proper operation of some aspects of development code 252 may be verified. If, however, after replaying replay transactions 323 within test environment 350, the state of test environment data stores 370 does not correspond to the state of production data stores 170 at time t2, then proper operation of development code 252 might not be confirmed. In this way, development code 252 may be evaluated on a release-to-release basis, where production environment 150 performed transactions between times t1 and t2 using a prior release of development code 252.

Test system 300 may evaluate other aspects of the behavior of test environment 350 during or after replaying, within test environment 350, replay transactions 323. For example, test system 300 may compare performance measures of one or more systems of test environment 350 during the replay of replay transactions 323. Such performance measures could include metrics such as CPU utilization, memory consumption, and/or speed of operation. Further, test system 300 may replay, within test environment 350, replay transactions 323 at a higher rate than the rate at which those transactions were processed within production environment 150. In other words, test system 300 may act as a load generator that increases the rate at which transactions within replay transactions 323 are issued to application servers 360. By observing the behavior of test environment 350 when application servers 360 is under a higher load, insights about the performance of test environment 350, and therefore, production environment 150, may be gained.

Test system 300 may periodically or occasionally create updated replay transactions 323, based on new sets of transactions captured within production environment 150, such as every quarter, each month, weekly (or any other appropriate time period). Further, in some examples, a prior replay transactions test script can be completely replaced by an updated replay transactions test script that is based on new transactions captured within production environment 150. If a prior test script is completely replaced by updated test script, the prior test script might no longer be needed, and life cycle maintenance of the prior test script is thereby avoided. Further, any new use case scripts that were merged into replay transactions 323 when creating the prior test script might also no longer be necessary, as such transactions may be effectively replaced by transactions in production, where the new production transactions provide adequate code coverage for previously new features. Accordingly, life cycle maintenance of prior new use case test scripts may also be avoided.

By generating a test script based on transactions processed by production environment 150, system 100 may effectively test development code 252 in an efficient and automated way. For instance, by using replay transactions 323 as a test script for testing development code 252 within test environment 350, development code 252 may be tested without requiring development of a large regression or performance test script, and without requiring maintenance of the life cycle of a large regression or performance test script. Also, by using replay transactions 323 as a test script within test environment 350, close to production-level code coverage may be achieved. Further, code coverage may more closely align with code usage patterns in production systems, since replay transactions 323 is based on transactions captured in production. Still further, by replaying replay transactions 323 at varying or increased rates within test environment 350, aspects of development code 252 and/or application servers 360 may be effectively tested to gain insights into how application servers 360 will perform when under a higher load.

In addition, by integrating test scripts associated with new use cases into a test script derived from transactions performed by a production system, system 100 may more effectively test new features or recent changes to development code 252 that might not be implicated by transactions captured in a production system that does not have those new features. Test scripts associated with new use cases, when integrated into a test script based on transaction data, may provide insights into how production environment 150 may perform or behave when development code 252 is placed into production within production environment 150.

Further, test scripts associated with new use cases may provide insights into zero-day security vulnerabilities and may provide other valuable instruction about how production environment 150 may behave when development code 252 is placed into production. For example, by evaluating development code 252 in the context of actual transactions observed in production, development code 252 may be subjected to the same or similar attempts to exploit security vulnerabilities that may be seen in production, because in many cases, those attempts to exploit security vulnerabilities will be included in transactions captured in production. Therefore, even in the absence of test scripts associated with new use cases, use of production transactions to evaluate development code 252 may provide insights into security vulnerabilities that would not be available if artificial or synthetic transactions were to be used in testing, instead of data describing or specifying actual transactions seen in production.

Although in some examples, test scripts associated with new use cases might not be generated automatically (and instead, may be developed by a test engineer or software developer), the number of such test scripts developed may be relatively small. Therefore, development of a large test script is avoided. Further, once development code 252 is placed into production environment 150, and a new test script can be generated based on transactions performed by production environment 150, the test scripts associated with the new use cases might no longer be needed. Accordingly, in at least some examples, manually-developed test scripts may, in many cases, be discarded, and may require little or no life cycle maintenance.

Accordingly, the techniques of this techniques of this disclosure may improve the function of computing devices within production environment 150 (e.g., 160) in a number of ways. For example, since computing devices within production environment 150 may be more effectively tested, computing devices within production environment 150 may be more reliable. Further, since generating a test script may be largely automated, time to market or deployment of new software may be reduced, making additional, advantageous new features of software available sooner. Further, since production environment 150 can be effectively tested under varying loads and under varying rates of transactions, insights about performance and capacity planning gained from such tests may result in computing devices within production environment 150 performing faster and/or with less latency. Further, since new use cases and potential security vulnerabilities can be effectively tested by integrating tests for new use cases within a test script derived from transactions in production, production environment 150 and computing devices within production environment 150 may be more secure, and may be less vulnerable to security exploits.

Figure 2:
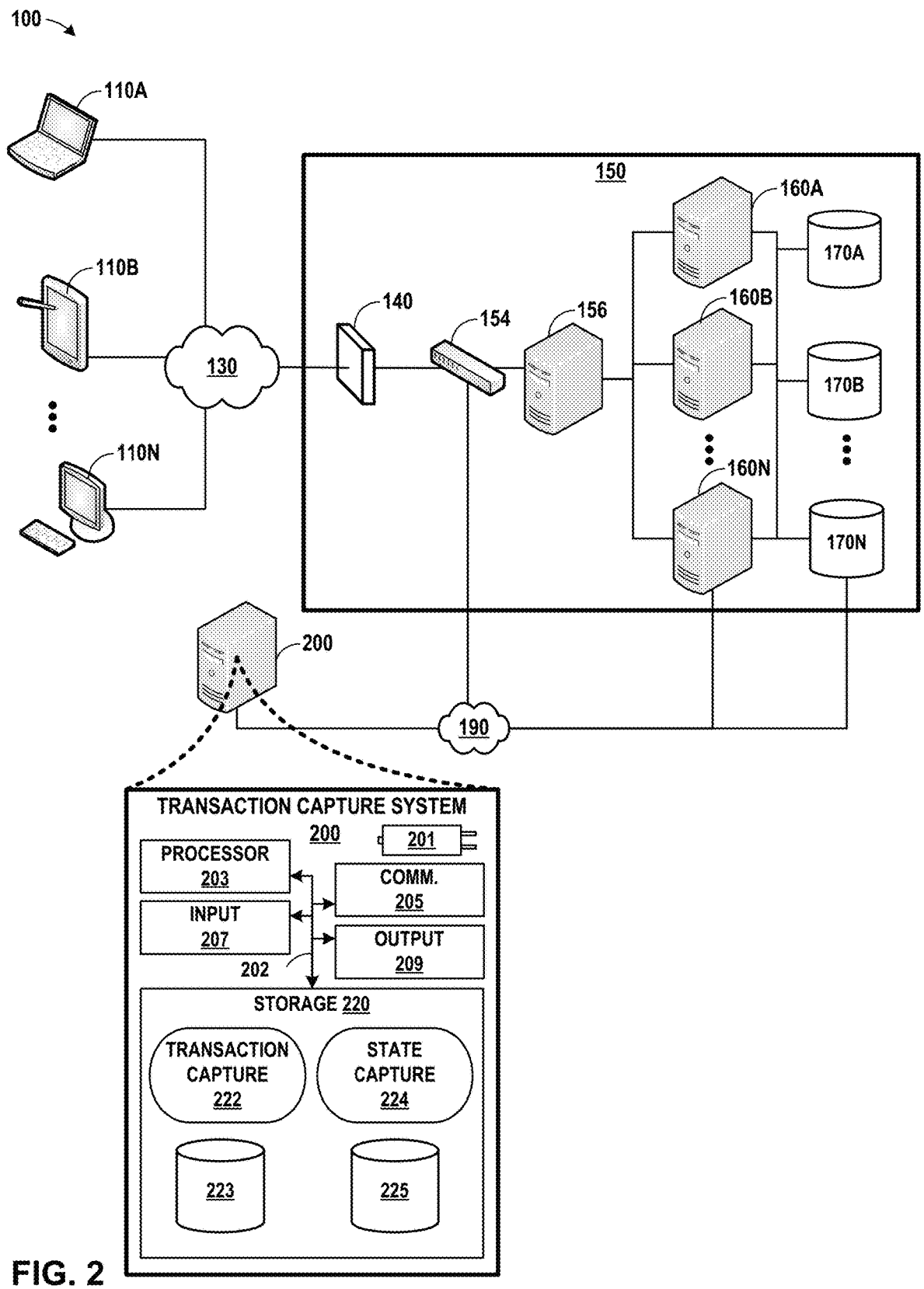
FIG. 2 is a conceptual diagram illustrating an example production environment along with a block diagram of an example transaction capture system that may capture information about transactions performed within the production environment, in accordance with one or more aspects of the present disclosure.

FIG. 2 is a conceptual diagram illustrating an example production environment along with a block diagram of an example transaction capture system that may capture information about transactions performed within the production environment, in accordance with one or more aspects of the present disclosure. Transaction capture system 200 of FIG. 2 may be described as an example or alternate implementation of transaction capture system 200 of FIG. 1, and some aspects of FIG. 2 may be described below within the context of system 100 of FIG. 1. FIG. 2 illustrates computing devices 110, network 130, production environment 150, private network 190, and transaction capture system 200. Transaction capture system 200 includes power source 201, one or more processors 203, one or more communication units 205, one or more input devices 207, one or more output devices 209, and one or more storage devices 220. Storage device 220 includes transaction capture module 222, state capture module 224, transaction capture data store 223, and state capture data store 225.

In FIG. 2, computing devices 110, network 130, production environment 150, and/or private network 190 may be implemented in a manner consistent with the description provided in connection with FIG. 1, and may include the same capabilities as described in connection with FIG. 1. In other examples, however, computing devices 110, network 130, production environment 150, and/or private network 190 of FIG. 2 may be implemented in a manner different than that described in connection with FIG. 1. For example, one or more of computing devices 110, network 130, production environment 150, and/or private network 190 of FIG. 2 may include more capabilities than those described in connection with FIG. 1, less capabilities than those described in connection with FIG. 1, or capabilities different than those described in connection with FIG. 1.

Power source 201 of processor 203 may provide power to one or more components of transaction capture system 200. Power source 201 may receive power from the primary alternative current (AC) power supply in a building, home, or other location. In other examples, power source 201 may be a battery. In still further examples, transaction capture system 200 and/or power source 201 may receive power from another source. One or more of the devices or components illustrated within transaction capture system 200 may be connected to power source 201, and/or may receive power from power source 201. Power source 201 may have intelligent power management or consumption capabilities, and such features may be controlled, accessed, or adjusted by one or more modules of transaction capture system 200 and/or by one or more processors 203 to intelligently consume, allocate, supply, or otherwise manage power.

One or more processors 203 of transaction capture system 200 may implement functionality and/or execute instructions associated with transaction capture system 200 or associated with one or more modules illustrated herein and/or described below. Examples of processors 203 include microprocessors, application processors, display controllers, auxiliary processors, one or more sensor hubs, and any other hardware configured to function as a processor, a processing unit, or a processing device. Transaction capture system 200 may use one or more processors 203 to perform operations in accordance with one or more aspects of the present disclosure using software, hardware, firmware, or a mixture of hardware, software, and firmware residing in and/or executing at transaction capture system 200.

One or more communication units 205 of transaction capture system 200 may communicate with devices external to transaction capture system 200 by transmitting and/or receiving data, and may operate, in some respects, as both an input device and an output device. In some examples, communication unit 205 may communicate with other devices over a network, such as private network 190. In other examples, communication units 205 may send and/or receive radio signals on a radio network such as a cellular radio network. In other examples, communication units 205 of transaction capture system 200 may transmit and/or receive satellite signals on a satellite network such as a Global Positioning System (GPS) network. Examples of communication units 205 include a network interface card (e.g. such as an Ethernet card), an optical transceiver, a radio frequency transceiver, a GPS receiver, or any other type of device that can send and/or receive information. Other examples of communication units 205 may include devices capable of communicating over Bluetooth®, GPS, NFC, ZigBee, and cellular networks (e.g., 3G, 4G), and Wi-Fi® radios found in mobile devices as well as Universal Serial Bus (USB) controllers and the like. Such communications may adhere to, implement, or abide by appropriate protocols, including TCP/IP, Ethernet, Bluetooth, NFC, or other technologies or protocols.

One or more input devices 207 may represent any input devices of transaction capture system 200; input devices 207 may generate, receive, and/or process input. For example, one or more input devices 207 may generate or receive input from a keyboard, pointing device, voice responsive system, video camera, button, sensor, mobile input device, control pad, microphone, presence-sensitive screen, network, or any other type of device for detecting input from a human or machine.

One or more output devices 209 may represent any output devices of transaction capture system 200; output devices 209 may generate, present, and/or process output. For example, one or more output devices 209 may generate, present, and/or process output in the form of tactile, audio, visual, and/or video output.

One or more storage devices 220 within transaction capture system 200 may store information for processing during operation of transaction capture system 200. Storage devices 220 may store program instructions and/or data associated with one or more of the modules described in accordance with one or more aspects of this disclosure. One or more processors 203 and one or more storage devices 220 may provide an operating environment or platform for such modules, which may be implemented as software, but may in some examples include any combination of hardware, firmware, and software. One or more processors 203 may execute instructions and one or more storage devices 220 may store instructions and/or data of one or more modules. The combination of processors 203 and storage devices 220 may retrieve, store, and/or execute the instructions and/or data of one or more applications, modules, or software. Processors 203 and/or storage devices 220 may also be operably coupled to one or more other software and/or hardware components, including, but not limited to, one or more of the components of transaction capture system 200 and/or one or more devices or systems illustrated as being connected to transaction capture system 200.

Transaction capture module 222 may perform services relating to capturing and processing transactions performed within production environment 150. For instance, transaction capture module 222 may receive from network monitor 154, over private network 190, information about transactions passing through network monitor 154. Transaction capture module 222 may process the transaction by organizing the transaction information into requests and responses, and filtering unwanted or unnecessary transactions. Transaction capture module 222 may also apply corrections and/or adjustments to the transaction data. Transaction capture module 222 may store transactions within transaction capture data store 223. Transaction capture module 222 may transfer information about the stored transactions to test system 300 over private network 190.

Transaction capture data store 223 may represent any suitable storage medium for storing information related to transactions processed within production environment 150. The information stored in transaction capture data store 223 may be searchable and/or categorized such that one or more modules within transaction capture system 200 may provide an input requesting information from transaction capture data store 223, and in response to the input, receive information stored within transaction capture data store 223. Transaction capture data store 223 may be primarily maintained by transaction capture module 222 and may store extract files created by transaction capture module 222 (see, e.g., FIG. 5). Transaction capture data store 223 may receive from transaction capture module 222 processed transaction information collected and processed by transaction capture module 222. Transaction capture data store 223 may provide other modules with access to the data stored within transaction capture data store 223, and/or may analyze the data stored within transaction capture data store 223 and output such information on behalf of other modules of transaction capture system 200.

State capture module 224 may perform services relating to capturing state information for one or more components, devices, or systems within production environment 150. For instance, state capture module 224 may receive, in response to a request that state capture module 224 may issue to one or more of production data stores 170, current state information for production data stores 170. Similarly, state capture module 224 may receive, in response to a request that state capture module 224 may issue to one or more production application servers 160, information about application-level state of production application servers 160 (e.g., application-level logs). State capture module 224 may store such state information within state capture data store 225. Further, state capture module 224 may store state information for one or more other systems, devices, and/or components within production environment 150. State capture module 224 may transfer state information to test system 300 over private network 190.

State capture data store 225 may represent any suitable storage medium for storing state information collected by state capture module 224 about production environment 150. The information stored in state capture data store 225 may be searchable and/or categorized such that one or more modules within transaction capture system 200 may provide an input requesting information from state capture data store 225, and in response to the input, receive information stored within state capture data store 225. State capture data store 225 may be primarily maintained by state capture module 224. State capture data store 225 may receive from state capture module 224 state information relating to production environment 150 collected and processed by state capture module 224. State capture data store 225 may provide other modules with access to the data stored within state capture data store 225, and/or may analyze the data stored within state capture data store 225 and output such information on behalf of other modules of transaction capture system 200.

Modules illustrated in FIG. 2 (e.g., transaction capture module 222, state capture module 224) and/or illustrated or described elsewhere in this disclosure (e.g., transaction processing module 322, state configuration module 324, and test evaluation module 326) may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
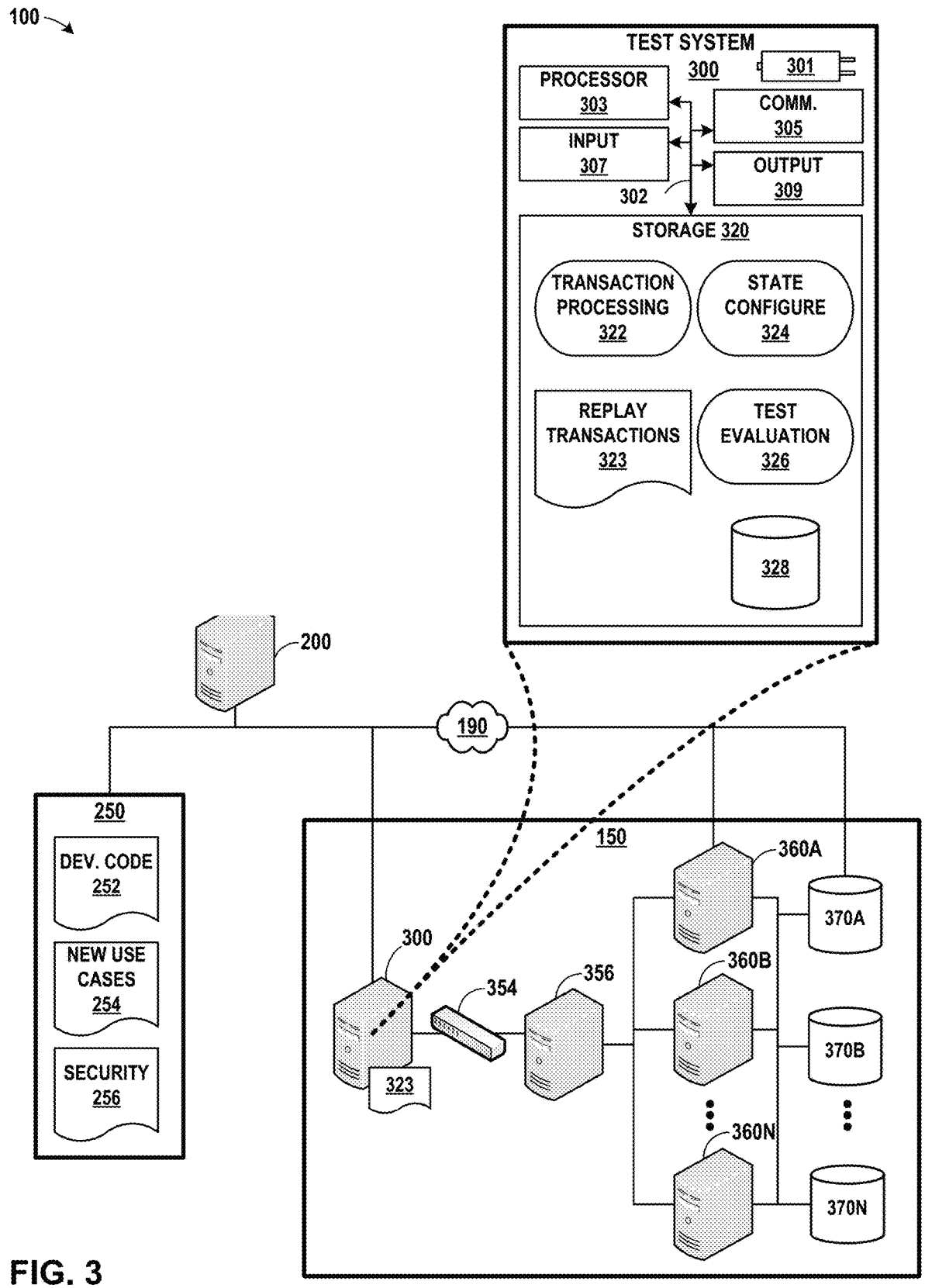
FIG. 3 is a conceptual diagram illustrating an example test environment along with a block diagram of an example test system that may replay transactions within the test environment, in accordance with one or more aspects of the present disclosure.

FIG. 3 is a conceptual diagram illustrating an example test environment along with a block diagram of an example test system that may replay transactions within the test environment, in accordance with one or more aspects of the present disclosure. Test system 300 of FIG. 3 may be described as an example or alternate implementation of test system 300 of FIG. 1, and some aspects of FIG. 3 may be described herein within the context of system 100 of FIG. 1. FIG. 3 illustrates private network 190, transaction capture system 200, production environment 150, and test environment 350. Test system 300 is included within test environment 350, and power source 301, one or more processors 303, one or more communication units 305, one or more input devices 307, one or more output devices 309, and one or more storage devices 320. Storage device 320 includes transaction processing module 322, state configuration module 324, replay transactions 323, and data store 328.

In FIG. 3, private network 190, development environment 250, and/or test environment 350 may be implemented in a manner consistent with the description provided in connection with FIG. 1, and may include the same capabilities as described in connection with FIG. 1. In other examples, however, private network 190, development environment 250, and/or test environment 350 of FIG. 3 may be implemented in a manner different than that described in connection with FIG. 1.

Power source 301 may provide power to one or more components of test system 300. As with transaction capture system 200, power source 301 may receive power from the primary alternative current (AC) power supply in a building, home, or other location. In other examples, power source 301 may be a battery. Test system 300 and/or power source 301 may receive power from another source. One or more of the devices or components illustrated within test system 300 may be connected to power source 301, and/or may receive power from power source 301. As in power source 201, power source 301 may have intelligent power management or consumption capabilities.

One or more processors 303 of test system 300 may implement functionality and/or execute instructions associated with test system 300 or associated with one or more modules illustrated herein and/or described below. Test system 300 may use one or more processors 303 to perform operations in accordance with one or more aspects of the present disclosure using software, hardware, firmware, or a mixture of hardware, software, and firmware residing in and/or executing at test system 300.

One or more communication units 305 of test system 300 may communicate with devices external to test system 300 by transmitting and/or receiving data, and may operate, in some respects, as both an input device and an output device. In some examples, communication unit 305 may communicate with other devices over private network 190, or in another way, such as in any manner described in connection with communication unit 205 of transaction capture system 200.

One or more input devices 307 may represent any input devices of test system 300, which may generate, receive, and/or process input. One or more input devices 307 may generate or receive input from a keyboard, pointing device, voice responsive system, video camera, button, sensor, mobile input device, control pad, microphone, presence-sensitive screen, network, or any other type of device for detecting input from a human or machine.

One or more output devices 309 may represent any output devices of test system 300, which may generate, present, and/or process output. One or more output devices 309 may generate, present, and/or process output in the form of tactile, audio, visual, and/or video output. Output devices 309 may include any type of device capable of generating tactile, audio, visual, video, or other output (e.g., a haptic response, a sound, a flash of light, and/or images).

One or more storage devices 320 within test system 300 may store information for processing during operation of test system 300. Storage devices 320 may store program instructions and/or data associated with one or more of the modules described in accordance with one or more aspects of this disclosure. One or more processors 303 and one or more storage devices 320 may provide an operating environment or platform for such modules, which may be implemented as software, but may in some examples include any combination of hardware, firmware, and software. One or more processors 303 may execute instructions and one or more storage devices 320 may store instructions and/or data of one or more modules. The combination of processors 303 and storage devices 320 may retrieve, store, and/or execute the instructions and/or data of one or more applications, modules, or software. Processors 303 and/or storage devices 320 may also be operably coupled to one or more other software and/or hardware components, including, but not limited to, one or more of the components of test system 300 and/or one or more devices or systems illustrated as being connected to test system 300.

In some examples, one or more storage devices 320 are temporary memories, meaning that a primary purpose of the one or more storage devices is not long-term storage. Storage devices 320 of transaction capture system 300 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 320, in some examples, also include one or more computer-readable storage media. Storage devices 320 may be configured to store larger amounts of information than volatile memory. Storage devices 320 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

Transaction processing module 322 may receive from transaction capture system 200 information about transactions processed within production environment 150. Transaction processing module 322 may process the transaction information to generate one or more test scripts (e.g., replay transactions 323) that mirror one or more aspects of the transactions performed within production environment 150. Transaction processing module 322 may store information relating to transaction information received from transaction capture system 200 within data store 328. Transaction processing module 322 may interact with and/or operate in conjunction with one or more modules of test system 300. Transaction processing module 322 may cause test system 300 to output within test environment 350 transactions to cause test environment 350 to perform operations. In some examples, transaction processing module 322 may cause test system 300 to output replay transactions 323 within test environment 350 to cause test environment 350 to process transactions previously processed at production environment 150.

State configuration module 324 may receive from transaction capture system 200 information about the state of production environment 150 at various points in time, and may store state information within data store 328. In preparation for testing one or more aspects of test environment 350, state configuration module 324 may configure the state of test environment 350 so that one or more of application servers 360, test environment data stores 370, or other systems or devices within test environment 350 may correspond to a known state of production environment 150. After a test, state configuration module 324 may query one of more systems or devices within test environment 350 for state information.

Test evaluation module 326 may generally perform operations relating to evaluating the performance, behavior, and/or other aspects of test environment 350 during and after test system 300 executes a test script within test environment 350. For example, test evaluation module 326 may receive information about performance metrics and operations performed by test environment 350 in response to one or more transactions being processed within test environment 350. Test evaluation module 326 may evaluate such information, and compare aspects of the performance and behavior of test environment 350 to the performance and behavior of production environment 150 when similar transactions were performed within production environment 150. Test evaluation module 326 may also evaluate the ability of test environment 350 to process transactions at different rates. Test evaluation module 326 may store, within data store 328, information about the performance and behavior of test environment 350. Test evaluation module 326 may output, for presentation to a user, information about the behavior of test environment 350 as compared to production environment 150.

Data store 328 may represent any suitable storage medium for storing information related to transactions executed within test environment 350, state information for production environment 150 and/or test environment 350, and information relating to the evaluation of the performance and behavior of test environment 350. The information stored in data store 328 may be searchable and/or categorized such that one or more modules within test system 300 may provide an input requesting information from data store 328, and in response to the input, receive information stored within data store 328. Aspects of data store 328 may be maintained by each of transaction processing module 322, state configuration module 324, and test evaluation module 326. Data store 328 may receive information from one or more of such modules information. Data store 328 may provide transaction processing module 322, state configuration module 324, and/or test evaluation module 326 with access to the data stored within data store 328, and/or may analyze the data stored within data store 328 and output such information on behalf one or more of transaction processing module 322, state configuration module 324, and/or test evaluation module 326.

Figure 4:
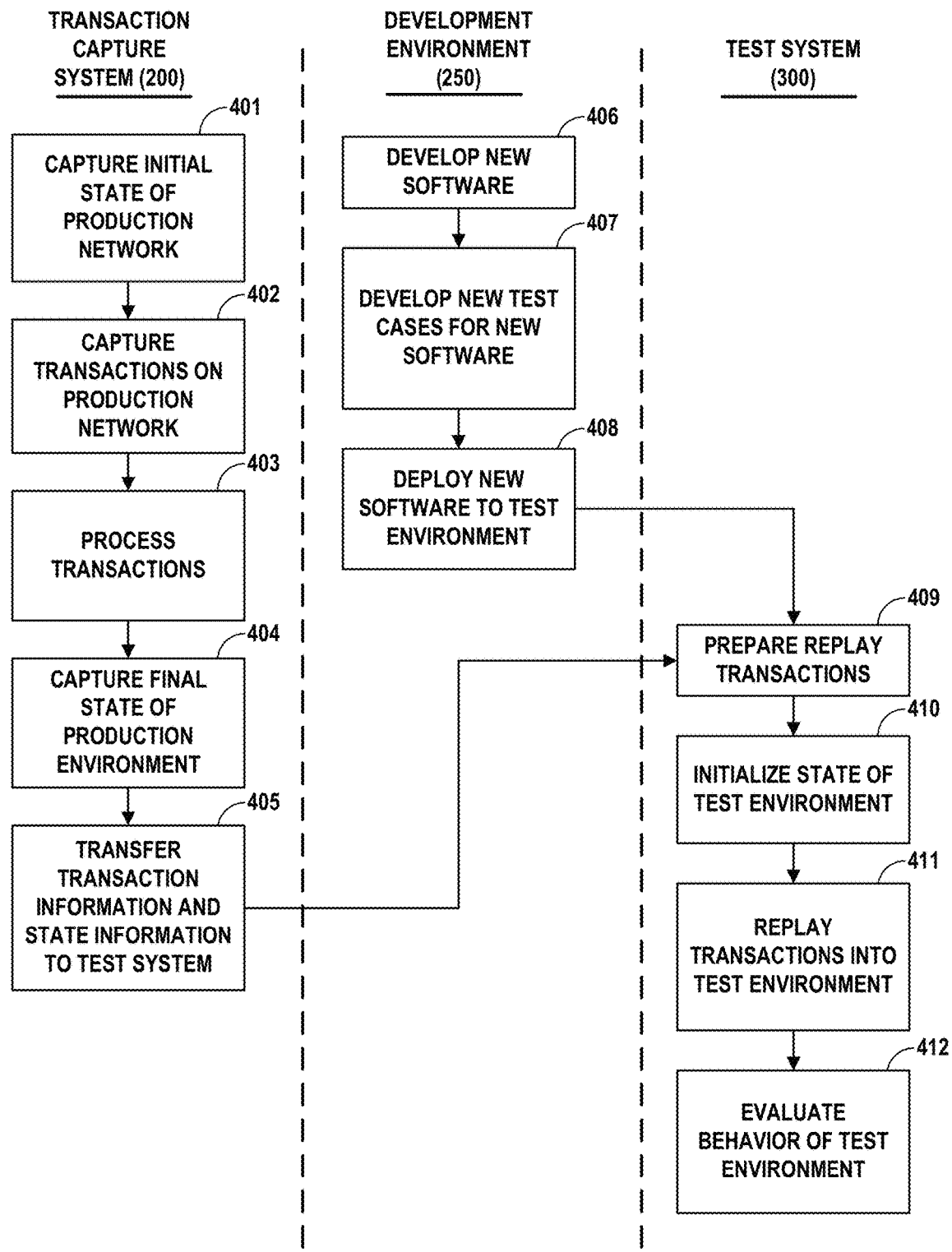
FIG. 4 is a flow diagram illustrating an example process for testing and evaluating the behavior and performance of a computing system in accordance with one or more aspects of the present disclosure.

FIG. 4 is a flow diagram illustrating an example process for testing and evaluating the behavior and performance of a computing system in accordance with one or more aspects of the present disclosure. The process of FIG. 4 is illustrated from three different perspectives: operations performed by an example transaction capture system 200 (left-hand column to the left of dashed line), operations performed by an example development environment 250 (middle column between dashed lines), and operations performed by an example test system 300 (right-hand column to the right of dashed line). In the example of FIG. 4, aspects of the operations performed by transaction capture system 200, development environment 250, and test system 300 may be described within the context of FIG. 1. Further, aspects of the operations performed by transaction capture system 200 may also be described in the context of the block diagram of FIG. 2, and aspects of the operations performed by test system 300 may also be performed in the context of the block diagram of FIG. 3. In other examples, different operations may be performed, or operations described in FIG. 4 as being performed by a particular component, module, system, and/or device may be performed by one or more other components, modules, systems, and/or devices. Further, in other examples, operations described in connection with FIG. 4 may be performed in a difference sequence, merged, or omitted, even where such operations are shown performed by more than one component, module, system, and/or device.

In the example of FIG. 4, and in accordance with one or more aspects of the present disclosure, transaction capture system 200 may collect state information relating to production environment 150 (401). For example, with reference to FIG. 2, one or more of input devices 207 may detect input and output to state capture module 224 an indication of input. State capture module 224 may determine that the input corresponds to a request to capture the state of production environment 150. The input may be the result of a user interaction with transaction capture system 200, may be the result of interaction with another system, and/or may be the result of a periodic or scheduled notification. State capture module 224 may cause communication unit 205 to output a signal over private network 190 that is routed to one or more production data stores 170. One or more production data stores 170 may detect the signal and determine that the signal corresponds to a request for information about the current state of the data within one or more production data stores 170. One or more production data stores 170 may output a signal over private network 190. Communication units 205 may detect a signal from private network 190 and output an indication of the signal to state capture module 224. State capture module 224 may determine that the signal corresponds to a state information for one or more production data stores 170. State capture module 224 may further determine that the state information corresponds to information about the current state of the data within one or more production data stores 170, the database structure of one or more production data stores 170, and/or other information about production data stores 170 at a particular point in time (e.g., time "t1"). State capture module 224 may store the state information in state capture data store 225.

In some examples, transaction capture system 200 may also collect information about the state of production application servers 160. To collect information about the state of production application servers 160, state capture module 224 may cause communication unit 205 to output a signal over private network 190. One or more of production application servers 160 may detect a signal over private network 190 and determine that the signal corresponds to a request for application-level state information (e.g., application-level logs) maintained by one or more production application servers 160. One or more of production application servers 160 may collect state information and transfer information over private network 190 to transaction capture system 200. Communication units 205 of transaction capture system 200 may detect input and output to state capture module 224 an indication of input. State capture module 224 may determine that the input corresponds to state information for one or more production application servers 160. Transaction capture system 200 may store, in state capture data store 225, information about the state of production application servers 160. In some examples, the stored information relating to the state of production application servers 160 may represent the state of production application servers 160 at time t1.

Transaction capture system 200 may capture transactions processed within production environment 150 (402). For example, communication unit 205 may detect input from private network 190 and output to transaction capture module 222 an indication of input. Transaction capture module 222 may determine that the input corresponds to transaction information received from network monitor 154. Transaction capture module 222 may determine that the transaction information corresponds to information about transactions processed within production environment 150 after time t1. Transaction capture module 222 may store the transaction information in transaction capture data store 223.

Before or after storing the transaction information, transaction capture module 222 may process the transaction information received from network monitor 154 (403). For example, transaction capture module 222 may organize the transaction information into requests and responses, and/or filter out unwanted and/or unnecessary transactions. Transaction capture module 222 may apply corrections and adjustments to the transaction data, which may fill any gaps that might exist in the data. Transaction capture module 222 may extract the body of one or more http requests and create xml data derived from the http request body. Transaction capture module 222 may also extract one or more http headers and store such headers in an xml format. Transaction capture module 222 may store the processed transaction information within transaction capture data store 223. In some examples, transaction capture module 222 may apply such corrections to the transaction data in near or seemingly near real-time as transaction capture system 200 receives transactions from network monitor 154. In other examples, transaction capture module 222 may store transactions in transaction capture data store 223, and apply such corrections to the transaction data at a later time by accessing the stored transaction data in transaction capture data store 223.

FIG. 5 illustrates example extract data generated by an example transaction capture system as a result of processing of transaction data captured within an example production environment 150. In the example illustrated in FIG. 5, extract data 501 includes the URI or URL of the http request, along with various parameters pertaining to the specific http request represented by extract data 501. In some examples, transaction capture data store 223 may be implemented through a file system, and transaction capture module 222 may store extract data in an extract xml file (e.g., named "SOAP.log.001") within the file system of transaction capture system 200. In such an example, transaction capture module 222 may receive transactions, and update an extract file with data from each new transaction. Transaction capture module 222 may continue to add data to the extract file until it reaches a maximum size (e.g., 2 Gb). The maximum size of the extract file may be chosen based on limitations, features, or potential optimizations relating of the file system corresponding to transaction capture data store 223 associated with transaction capture system 200. Once the extract file reaches the maximum size, transaction processing module 322 may create a new extract file (e.g., named "SOAP.log.002") and begin storing data from future transactions in the new extract file. Transaction processing module 322 may continue the process until the transaction data for a given day is completed. Transaction processing module 322 may repeat the process for the next day using a new set of extract files. In some examples, transaction processing module 322 may create on the order of several hundred extract files each day, and transaction processing module 322 may store tens of millions of instances of extract data in those files. In other examples, transaction processing module 322 may store instances of extract data at a higher rate, so that transaction processing module 322 may store many more than tens of millions of instances of extract data in a given day.

In accordance with one or more aspects of the present disclosure, the implementation details relating to storing extract data 501 may differ widely in different examples. For instance, the size of the extract file may, in some examples, have no practical limit, or may be limited only by resource constraints or hardware restrictions. In such examples, it may be possible to implement aspects of the present disclosure using only one extract file (e.g., named "SOAP.log"), or one extract file per day, per week, per month, or for another time period. Further, although certain processing operations involving transaction data have been described as being performed by transaction capture module 222, in other examples, the same, similar, or related processing operations may be performed on transaction data by one or more modules of test system 300, such as transaction processing module 322.

Referring again to FIG. 4, transaction capture system 200 may capture information about the state of production environment 150 at a later point in time (404). For example, at time t2, which may be hours or days after t1, state capture module 224 may cause communication unit 205 to send one or more signals over private network 190 that production application servers 160 and/or production data stores 170 determine corresponds to a request for information about the current state (e.g., at t2) of production application servers 160 and/or production data stores 170. One or more of production data stores 170 may respond to the signals by transferring information over private network 190 to transaction capture system 200. Additionally, or alternatively, one or more of production application servers 160 may respond by transferring information over private network 190 to transaction capture system 200. Communication unit 205 of transaction capture system 200 may detect input and output to state capture module 224 an indication of input. State capture module 224 may determine that the input corresponds to state information, at time t2, for one or more of production application servers 160 and/or production data stores 170. State capture module 224 may store the state information within state capture data store 225.

Transaction capture system 200 may transfer transaction and state information to test system 300 in preparation for performing a test within test environment 350 (405). For example, transaction capture module 222 may access transaction capture data store 223 and cause communication unit 205 to output a signal over private network 190. Communication unit 305 may detect a signal from private network 190 and output to transaction processing module 322 an indication of the detected signal. Transaction processing module 322 may determine that the signal corresponds to transaction information from transaction capture system 200. Transaction processing module 322 may further determine that the signal corresponds to transaction information corresponding to or similar to the extract files created by transaction capture module 222 and illustrated in FIG. 5. Transaction processing module 322 may store the transaction information in data store 328.

Similarly, transaction capture system 200 may also transfer state information to test system 300. For example, state capture module 224 may access state capture data store 225 and cause communication unit 205 to output a signal over private network 190. Communication unit 305 may detect a signal from private network 190 and output to state configuration module 324 an indication of the detected signal. State configuration module 324 may determine that the signal corresponds to state information for one or more production application servers 160 and/or production data stores 170. State configuration module 324 may store the state information in data store 328.

Development environment 250 (or systems and computing devices within development environment 250) may, in response to input from one or more users or software developers, create new software code (406). For example, with reference to FIG. 1, a computing device within development environment 250 may detect input that corresponds to development, creation, modification, and/or maintenance of development code 252 that is designed for eventual deployment at one or more production application servers 160. Further, development environment 250 may, at the direction of one or more developers, test engineers, or users, create one or more new use case scripts 254 for testing new or modified aspects of development code 252 (407). Development environment 250 may further develop, in response to input from one or more users of development environment 250, security testing scripts 256. Security testing scripts 256 may be used for testing security features implemented by development code 252. Alternatively, or in addition, security testing scripts 256 may be used to test security features of production environment 150 and/or production application servers 160 that might be affected by new code within development code 252. Development environment 250 may store development code 252, new use case scripts 254, and/or security testing scripts 256 on one or more storage devices associated with development environment 250.

Development environment 250 may deploy development code 252 within test environment 350 (408). For example, development environment 250 may output to private network 190 information that includes development code 252. Private network 190 may receive the information from development environment 250 and route the information to one or more application servers 360. Application servers 360 may receive the information from private network 190 and determine that the information corresponds to or includes development code 252. One or more application servers 360 may install, deploy, or configure development code 252 within one or more storage devices associated with each of application servers 360 as one or more modules for execution by processors of application servers 360.

In addition to deploying development code 252 within test environment 350, development environment 250 may transfer development code 252, new use case scripts 254, and/or security testing scripts 256 to test system 300 for use in creating replay transactions 323. For example, development environment 250 may send information over private network 190 to test system 300. Communication unit 305 may detect input at test system 300, and output an indication of the input to transaction processing module 322. Transaction processing module 322 may determine that the input corresponds to information about new use case scripts 254 and security testing scripts 256. Transaction processing module 322 may store the information about new use case scripts 254 and security testing scripts 256 within data store 328.

Test system 300 may prepare replay transactions 323 by processing transaction information stored in data store 328 (409). For example, transaction processing module 322 may access in data store 328 information about transactions processed at production environment 150 between times t1 and t2. In some examples, the information may be in the form of an extract file, such as that illustrated in FIG. 5. Transaction processing module 322 may process such information by discarding transactions not needed to perform a desired test or to test certain functionality of production environment 150, development code 252, and/or production application servers 160. In other examples, transaction processing module 322 may discard transactions not within a specific timeframe sought to be tested (e.g., between times t1 and t2). Transaction processing module 322 may also update aspects of extract files to address any deficiencies or formatting issues. For example, transaction processing module 322 may update any Simple Object Access Protocol Action (SOAPAction) HTTP request header field values in the extract files that are blank by including within the header file the appropriate SOAPAction service implicated by the http transaction. In some examples, the SOAPAction header field may be used to identify the intent of the SOAP HTTP request; for example, the SOAPAction headers that relate to authentication may identify an authentication intent. Transaction processing module 322 may update the xml structure to ensure that the structure of the xml is consistent with expected form. Transaction processing module 322 may store the processed transaction data as replay transactions 323.

Test system 300 may also merge information from new use case scripts 254 and security testing scripts 256 into replay transactions 323. For example, transaction processing module 322 may access information about new use case scripts 254 and/or security testing scripts 256 within data store 328. Transaction processing module 322 may update replay transactions 323 to include information from new use case scripts 254 and/or security testing scripts 256 so that new use cases are tested when replay transactions 323 is replayed within test environment 350. In some examples, transactions captured from production environment 150 might not include transactions that provide coverage of new features or aspects of development code 252. For instance, historical transactions processed by production environment 150 might not include transactions that relate or include aspects of a new feature enabled by development code 252, since production application servers 160 may execute a prior version of development code 252 that did not enable the new feature. Therefore, to provide coverage of code implementing the new feature, new use case scripts 254 may be included or merged into replay transactions 323.

In preparation for testing development code 252 by replaying replay transactions 323 within test environment 350, test system 300 may initialize the state of test environment 350 so that it corresponds to the state of production environment 150 at time t1 (410). For example, state configuration module 324 may cause communication unit 305 to output a signal over private network 190. One or more test environment data stores 370 may detect a signal from private network 190 and determine that the signal corresponds to state information for test environment data stores 370. One or more test environment request data stores 370 may further determine that the state information corresponds to the state of production data stores 170 captured at time t1. Test environment data stores 370 may each update their state to match or correspond to the state of production data stores 170 at time t1 within production environment 150. Similarly, state configuration module 324 may cause communication unit 305 to output a signal over private network 190 that is received by one or more application servers 360. One or more application servers 360 may determine that the signal corresponds to state information for application servers 360 (e.g., application-level state information), and may further determine that the state information corresponds to the state of production application servers 160 at time t1 within production environment 150. Application servers 360 may each update their state to match or correspond to the state of production application servers 160 at time t1 within production environment 150.

Test system 300 may test development code 252 by replaying replay transactions 323 within test environment 350 (411). For example, with reference to FIG. 3, transaction processing module 322 may cause communication unit 305 to output one or more transactions from replay transactions 323 to network monitor 354 over a connection between test system 300 and network monitor 354. In some examples, the connection between test system 300 and network monitor 354 may be a direction connection. In other examples, such a connection may be through a network, such as private network 190.

Network monitor 354 may receive the transactions from test system 300 and pass them along to load balancer 356. Load balancer 356 may receive the transactions and allocate the transactions among application servers 360. Application servers 360 may perform operations specified by the transactions. For instance, application servers 360 may cause one or more of test environment data stores 370 to be created, modified, or updated. Application servers 360 may communicate a response to one or more of the transactions included within replay transactions 323 through load balancer 356 and network monitor 354 back to test system 300. Communication unit 305 may detect input and output an indication of input to transaction processing module 322 and an indication of input to test evaluation module 326. Transaction processing module 322 may determine that the input corresponds to a response to one or more transactions initiated by test system 300 based on replay transactions 323. Transaction processing module 322 may initiate one or more responsive transactions, based on the indication of put received from communication unit 305. Test evaluation module 326 may also determine that the input corresponds to a response to one or more transactions initiated by test system 300 based on replay transactions 323. Test evaluation module 326 may also determine that the input includes information about performance metrics and operations performed by test environment 350 in response to replay transactions 323 being processed within test environment 350. Test evaluation module 326 may evaluate the information received, and determine that one or more aspects of the performance of development code 252 are the same as or are different than those same or similar performance aspects of production environment 150 between times t1 and t2. Test evaluation module 326 may also determine that one or more aspects of the operation of the development code 252 are the same as or are different than those aspects of the operation of production environment 150 between times t1 and t2. Test evaluation module 326 may store, within data store 328, information about the behavior of test environment 350, and such information may include how the behavior of test environment 350 compares to that of production environment 150 between times t1 and t2. Test evaluation module 326 may output, for display or review by a user, information about the behavior of test environment 350 as compared to production environment 150. Transaction processing module 322 may continue to cause test system 300 to replay transactions within test environment 350 until the transactions within replay transactions 323 are exhausted.

In some examples, transaction processing module 322 may output replay transactions 323 at a different rate than the corresponding transactions were processed within production environment 150 between times t1 and t2. Test evaluation module 326 may evaluate the ability of test environment 350 and/or development code 252 to process transactions at different rates. By processing replay transactions 323 within test environment 350 at different rates, the performance or behavior of one or more components, modules, or other aspects of test environment 350 may change, and may reveal potential performance, operation, or other issues that might not otherwise be apparent within test environment 350. In another example, processing replay transactions 323 may raise or highlight potential security issues presented by development code 252, which can be addressed prior to deploying development code 252 in production environment 150.

Test evaluation module 326 may receive indications of input from communication unit 305 that test evaluation module 326 determines corresponds to information about how test environment 350, application servers 360, and/or development code 252 are able to process transactions at different rates. Test evaluation module 326 may store, within data store 328, information about test environment 350 and/or development code 252 when transactions are processed at different rates. Test evaluation module 326 may generate output, for display or otherwise review by a user, information about the performance of test environment 350 and/or development code 252 when transactions are processed at differing rates.

In some examples, processing replay transactions 323 within test environment 350 may provide useful information about how development code 252 affects the triggering of fraud rules. In general, fraud rules may be pre-defined formulas and/or processes for detecting potentially fraudulent activity in online application transaction activity, through examination of how a customer uses the network-enabled application and suspicious patterns of activity. A fraud rule may include a set of one or more business signatures and parameters embodied in a policy, which is executed either (a) as specific web traffic patterns are recognized, or (b) on a time interval to scan historical customer sessions, or (c) in response to another rule. In some cases, when the fraud rules detect a suspicious activity, a risk score or rating is also calculated and a record is made of that fraud event detection and an alert may be generated so that further action may be taken. For instance, when test system 300 causes test environment 350 to process replay transactions 323 within test environment 350, it may become apparent that development code 252 causes changes to one or more of application servers 360 such that fraud alerts are generated too frequently, or in another example, not frequently enough. Such information may be evaluated by developers and/or test engineers to determine whether modifications to development code 252 may be required.

Test system 300 may evaluate the performance and other aspects of development code 252 by observing the behavior of test environment 350 when processing replay transactions 323 (412). When all of replay transactions 323 have been processed within test environment 350, test evaluation module 326 may evaluate the performance and operation of test environment 350, as compared to production environment 150. For example, test evaluation module 326 may determine performance metrics during relating to the processing of replay transactions 323 within test environment 350, and compare the metrics to corresponding metrics collected by network monitor 154 and/or transaction capture system 200 within production environment 150 between times t1 and t2. Also, after test system 300 finishes replaying replay transactions 323, the state of test environment data stores 370 may correspond to the state of production data stores 170 at time t2, since the transactions within replay transactions 323 may correspond to those processed within production environment 150 between times t1 and t2. Accordingly, after processing the transactions within replay transactions 323, at least some aspects of test environment 350 may, if development code 252 operated properly, be a mirror image or corresponding image of production environment 150 at time t2. In other words, if the state of test environment data stores 370 after replaying replay transactions 323 corresponds to the state of production data stores 170 at time t2, then the operation of development code 252 may be verified. If, however, after replaying replay transactions 323 within test environment 350, the state of test environment data stores 370 does not correspond to the state of production data stores 170 at time t2, then the proper operation of development code 252 might not be confirmed.

Test system 300 may evaluate other aspects of the behavior of test environment 350 during or after the replay of replay transactions 323 within test environment 350. For example, test system 300 may compare performance measures of one or more systems of test environment 350 during the replay of replay transactions 323. Such performance measures could include metrics such as CPU utilization, memory consumption, and/or speed of operation.

Figure 6:
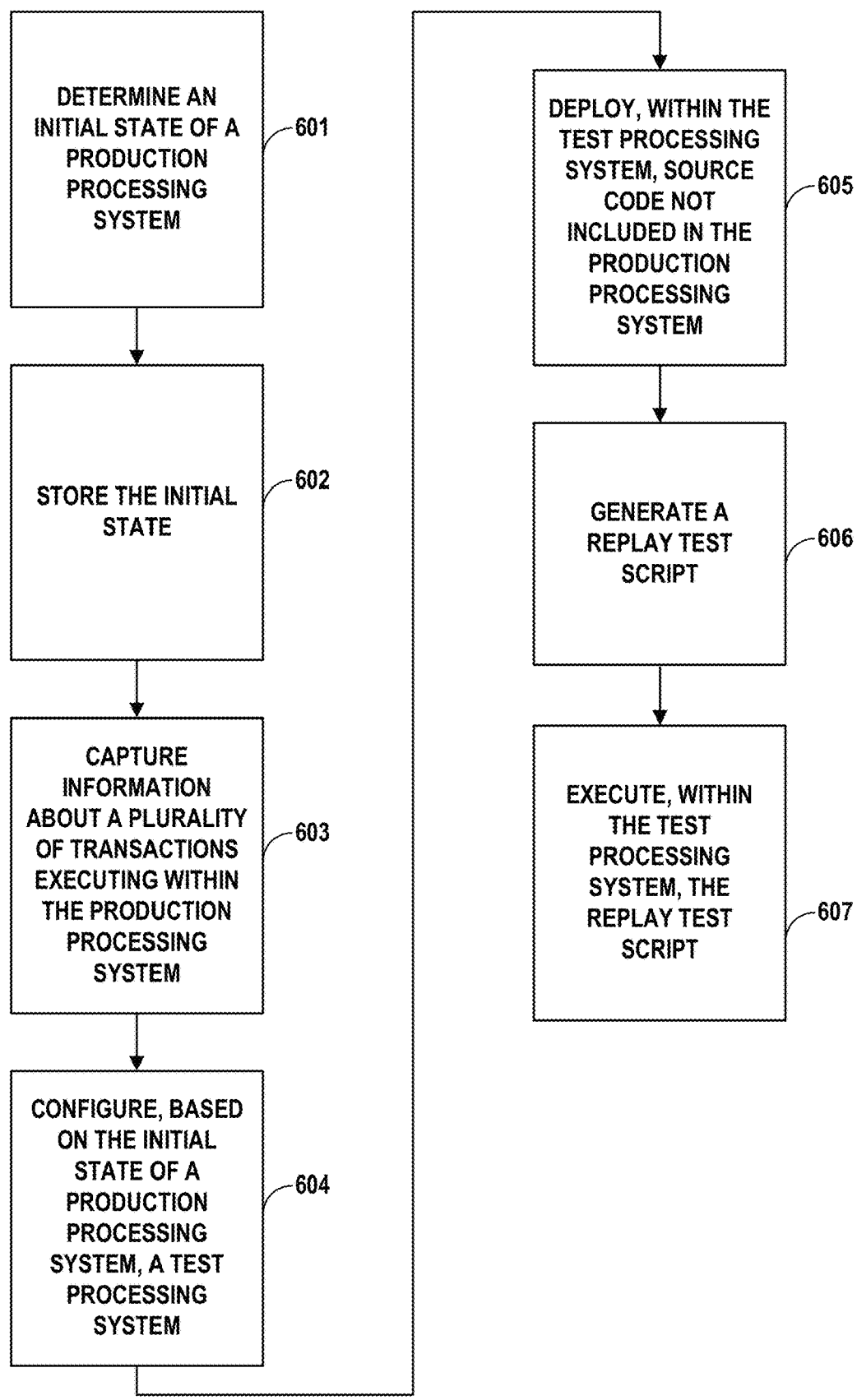
FIG. 6 is a flow diagram illustrating operations performed by an example system in accordance with one or more aspects of the present disclosure.

FIG. 6 is a flow diagram illustrating operations performed by an example system in accordance with one or more aspects of the present disclosure. FIG. 6 is described below within the context of system 100 of FIG. 1. In other examples, operations described in FIG. 6 may be performed by one or more other components, modules, systems, or devices. Further, in other examples, operations described in connection with FIG. 6 may be merged, performed in a difference sequence, or omitted.

In the example of FIG. 6, and in accordance with one or more aspects of the present disclosure, system 100 may determine an initial state of a production processing system (601). For example, transaction capture system 200 may collect information about the state of production environment 150 at time t1. Transaction capture system 200 may collect state information from one or more of production application servers 160 and/or production data stores 170. System 100 may store the initial state (602). For example, transaction capture system 200 may store information about the state of production environment 150 in state capture data store 225 within storage device 220.

System 100 may capture information about a plurality of transactions executing within the production processing system (603). For example, while transactions are being processed by production environment 150, transaction capture system 200 may capture and store data associated with transactions performed by production environment 150. Transaction capture system 200 may receive transactions processed within production environment 150 from network monitor 154 over private network 190.

System 100 may configure, based on the initial state of a production processing system, a test processing system (604). For example, test system 300 may configure the state of test environment 350 (e.g., test environment data stores 370) to correspond to the state of production environment 150 (e.g., production data stores 170) at time t1.

System 100 may deploy, within the test processing system, source code not included in the production processing system (605). For example, one or more application servers 360 within test environment 350 may receive development code 252 from development environment 250, and may install or configure development code 252 for execution or operation on one or more of production application servers 160 within test environment 350.

System 100 may generate, based on the information about the plurality of transactions, a replay test script, wherein the replay test script comprises a replay of the plurality of transactions, and wherein the replay test script further comprises transactions based on a new use case for the source code not included in the production processing system (606). For example, test system 300 may create a replay test script comprising replay transactions 323 based on transactions captured by transaction capture system 200 after time t1. Test system 300 may merge transactions derived from information about new use cases with transactions captured by transaction capture system 200. Test system 300 may store the merged transactions as replay transactions 323, which may serve as a replay test script.

System 100 may execute, within the test processing system, the replay test script (607). For example, test system 300 may test the function, operation, performance, and/or other characteristics of development code 252 by replaying, within test environment 350, replay transactions 323 as a replay test script.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    communicating with a production processing system, by a computing system and over a network, to determine an initial state of the production processing system;
    capturing, by the computing system and based on network traffic observed within the production processing system, information about a plurality of transactions executing across a plurality of application servers included within the production processing system, wherein the information about the plurality of transactions includes information identifying hypertext transfer protocol requests and responses involving one or more of the plurality of application servers;
    communicating with a test processing system, by the computing system and over the network, to deploy source code within the test processing system that is not included in the production processing system, wherein the test processing system includes a plurality of test application servers;
    generating, by the computing system and based on the information about the plurality of transactions executing across the plurality of application servers within the production processing system, a replay test script, wherein the replay test script comprises a replay of the plurality of transactions;
    merging, by the computing system and into the replay test script, a new use case script developed to exercise functionality of the source code not included in the production processing system; and communicating with the test processing system, by the computing system and over the network, to enable the test processing system to execute the replay test script.

2. The method of claim 1, further comprising:
after enabling the test processing system to execute the replay test script, identifying, by the computing system and based on the new use case script, integration defects caused by incorrect interactions between source code included in the production processing system and the source code not included in the production processing system.

3. The method of claim 1, further comprising:
generating, by the computing system and based on the information about the plurality of transactions executing across the plurality of application servers included within the production processing system, extract files organized into hypertext transfer protocol requests and responses across the plurality of application servers.

4. The method of claim 3, wherein generating the replay test script includes:
generating the replay test script based on the extract files.

5. The method of claim 4, wherein generating the replay test script further includes:
updating at least some of the extract files to include information pertinent to a testing scenario, and to disregard at least some of the extract files not pertinent to the testing scenario.

6. The method of claim 4, wherein generating the replay test script further includes:
updating, without requiring input from a user, at least some of the extract files to include information pertinent to a testing scenario, and to disregard at least some of the extract files not pertinent to the testing scenario.

7. The method of claim 1, wherein capturing information about the plurality of transactions executing across the plurality of application servers included within the production processing system includes:
monitoring information between a firewall and the production processing system.

8. The method of claim 1, further comprising:
after capturing the information about the plurality of transactions executing within the production processing system, determining, by the computing system, an updated state of the production processing system; and storing the updated state.

9. The method of claim 8, further comprising:
evaluating, by the computing system, the operation of the source code not included in the production processing system by comparing the state of the test processing system after executing the replay test script with the updated state of the production processing system.

10. The method of claim 1, further comprising:
evaluating, by the computing system, the operation of the source code not included in the production processing system by observing operations performed by the test processing system.

11. The method of claim 1, wherein the plurality of transactions executing within the production processing system are executed at a production rate, and wherein executing the replay test script comprises:
replaying transactions within the replay test script at a faster rate than the production rate.

12. A system comprising;
a production processing system;
a test processing system; and
a computing system having access to the production processing system and the test processing system over a network, wherein the computing system comprises processing circuitry configured to:
communicate with a production processing system, over a network, to determine an initial state of the production processing system,
capture, based on network traffic observed within the production processing system, information about a plurality of transactions executing across a plurality of application servers included within the production processing system, wherein the information about the plurality of transactions includes information identifying hypertext transfer protocol requests and responses involving one or more of the plurality of application servers,
communicate with a test processing system, over the network, to deploy source code within the test processing system that is not included in the production processing system, wherein the test processing system includes a plurality of test application servers,
generate, based on the information about the plurality of transactions executing across the plurality of application servers within the production processing system, a replay test script, wherein the replay test script comprises a replay of the plurality of transactions,
merge, into the replay test script, a new use case script developed to exercise functionality of the source code not included in the production processing system; and
communicate with the test processing system, over the network, to enable the test processing system to execute the replay test script.

13. The system of claim 12, wherein the processing circuitry is further configured to:
after enabling the test processing system to execute the replay test script, identify, based on the new use case script, integration defects caused by incorrect interactions between source code included in the production processing system and the source code not included in the production processing system.

14. The system of claim 12, wherein the processing circuitry is further configured to:
generate, based on the information about the plurality of transactions executing across the plurality of application servers included within the production processing system, extract files organized into hypertext transfer protocol requests and responses across the plurality of application servers.

15. The system of claim 14, wherein to generate the replay test script, the processing circuitry is further configured to:
generate the replay test script based on the extract files.

16. The system of claim 12, wherein to capture information about the plurality of transactions executing across a plurality of application servers included within the production processing system, the processing circuitry is further configured to:
monitor information between a firewall and the production processing system.

17. The system of claim 12, wherein the processing circuitry is further configured to:
after capturing the information about the plurality of transactions executing within the production processing system, determining, by the computing system, an updated state of the production processing system; and store the updated state.

18. The system of claim 17, wherein the processing circuitry is further configured to:

evaluate, by the computing system, the operation of the source code not included in the production processing system by comparing the state of the test processing system after executing the replay test script with the updated state of the production processing system.

19. A non-transitory computer-readable storage medium comprising instructions that, when executed, configure processing circuitry of a computing system to:

communicate with a production processing system, over a network, to determine an initial state of the production processing system;

capture, based on network traffic observed within the production processing system, information about a plurality of transactions executing across a plurality of application servers included within the production processing system, wherein the information about the plurality of transactions includes information identifying hypertext transfer protocol requests and responses involving one or more of the plurality of application servers;

communicate with a test processing system, over the network, to deploy source code within the test processing system that is not included in the production processing system, wherein the test processing system includes a plurality of test application servers;

generate, based on the information about the plurality of transactions executing across the plurality of application servers within the production processing system, a replay test script, wherein the replay test script comprises a replay of the plurality of transactions;

merge, into the replay test script, a new use case script developed to exercise functionality of the source code not included in the production processing system; and communicate with the test processing system, over the network, to enable the test processing system to execute the replay test script.

20. The computer-readable storage medium of claim 19, wherein the instructions, when executed, further configure the processing circuitry to:

generate, based on the information about the plurality of transactions executing across the plurality of application servers included within the production processing system, extract files organized into hypertext transfer protocol requests and responses across the plurality of application servers.

* * * * *